US007249077B2

(12) United States Patent
Williams et al.

(10) Patent No.: US 7,249,077 B2
(45) Date of Patent: Jul. 24, 2007

(54) METHODS FOR ISSUING, DISTRIBUTING, MANAGING AND REDEEMING INVESTMENT INSTRUMENTS PROVIDING SECURITIZED ANNUITY OPTIONS

(75) Inventors: James Benjamin Williams, Sherborn, MA (US); Francois G. Gadenne, Marblehead, MA (US)

(73) Assignee: Retirement Engineering, Inc., Boston, MA (US)

( * ) Notice: Subject to any disclaimer, the term of this patent is extended or adjusted under 35 U.S.C. 154(b) by 113 days.

(21) Appl. No.: 10/797,889

(22) Filed: Mar. 10, 2004

(65) Prior Publication Data

US 2004/0177022 A1    Sep. 9, 2004

Related U.S. Application Data

(63) Continuation-in-part of application No. 10/273,542, filed on Oct. 19, 2002.

(60) Provisional application No. 60/519,104, filed on Nov. 12, 2003, provisional application No. 60/453,164, filed on Mar. 10, 2003.

(51) Int. Cl.
*G06Q 40/00* (2006.01)
(52) U.S. Cl. ............................................. 705/35; 705/4
(58) Field of Classification Search .................. 705/36, 705/37, 35, 4
See application file for complete search history.

(56) References Cited

U.S. PATENT DOCUMENTS

| | | | | | |
|---|---|---|---|---|---|
| 2,085,174 | A | * | 6/1937 | Stelter | ........................ 460/16 |
| 5,875,437 | A | * | 2/1999 | Atkins | ......................... 705/40 |
| 5,903,879 | A | * | 5/1999 | Mitchell | ....................... 705/38 |
| 5,926,792 | A | * | 7/1999 | Koppes et al. | ................. 705/4 |
| 5,999,917 | A | * | 12/1999 | Facciani et al. | ............... 705/36 |
| 6,064,969 | A | * | 5/2000 | Haskins | ......................... 705/4 |
| 6,411,939 | B1 | * | 6/2002 | Parsons | ....................... 705/35 |
| 6,611,815 | B1 | * | 8/2003 | Lewis et al. | .............. 705/36 R |
| 2005/0154658 | A1 | * | 7/2005 | Bove et al. | .................... 705/35 |

OTHER PUBLICATIONS

Steven A. Sass, "The Promise of Private Pensions : The First Hundred Years" (1997) pp. 69-75 and 274-275, ISBN: 0674945204, Harvard University Press, Cambridge, MA.

* cited by examiner

*Primary Examiner*—Hani M. Kazimi
*Assistant Examiner*—Olabode Akintola
(74) *Attorney, Agent, or Firm*—Charles G. Call

(57) ABSTRACT

A method of issuing and managing investment instruments called "Pension Shares" which preferably take the form of securities that represents a claim against and is secured by an investment fund. A Pension Share entitles its holder to receive, at a specified maturity date, either a lump sum payment amount or, at the option of said holder, to receive a sequence of annuity payments. The Pension Share issuer creates and manages the investment fund such that its net asset value at the maturity date will be adequate to make the lump sum payment or provide the holder with the annuity. A preferred form of Pension Share provides an annuity option of one dollar per for the life of the holder, or his or her survivor, both of whom are at a predetermined age at the maturity date. A Pension Share may be redeemed on demand in advance of the maturity date so that it may be exchanged for a Pension Share having a different maturity date if the holder's plans change.

12 Claims, 11 Drawing Sheets

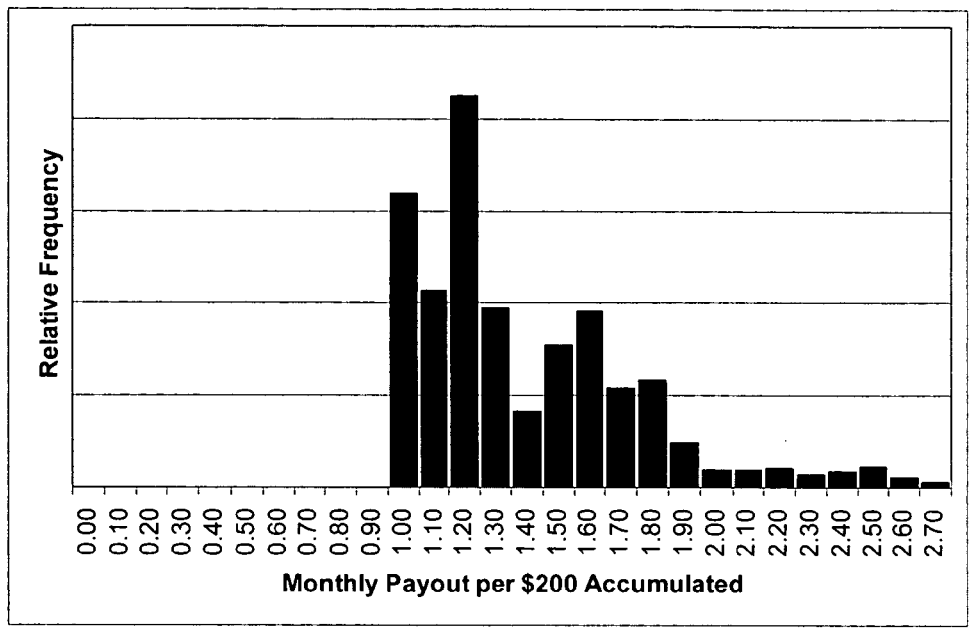
Fig. 4
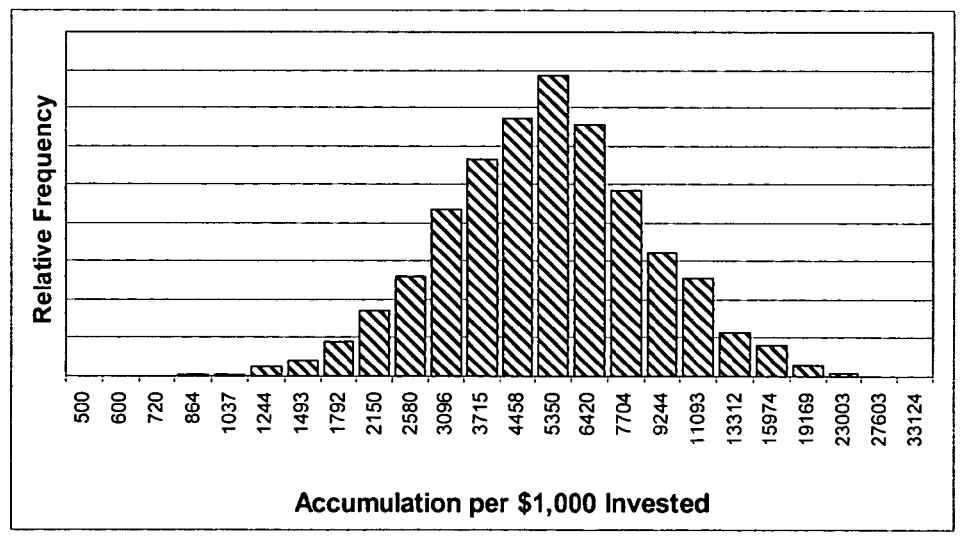
Fig. .5

GRInS™ Benchmark™
Spend it or Save it?

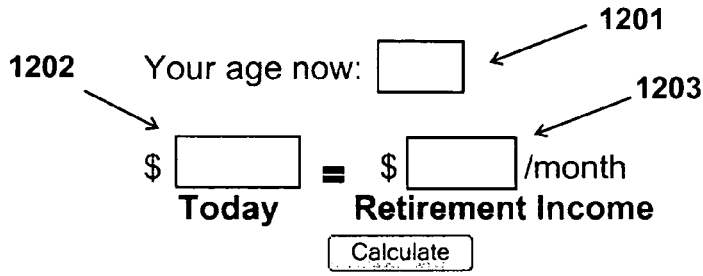

What this means: If you spend the amount in the Today box now, it costs you *at least* the amount shown in the Retirement Income box.

Another way to look at it — if you invest the amount in the Today box, you could depend on the additional Retirement Income shown.

Assumptions. The calculation is based on investment returns and payouts as defined by the *GRInS Benchmark*. The Benchmark assumes:

- you will retire at the standard retirement age (the Social Security full benefit age),
- the payout will continue as long as you or a spouse of the same age live,
- and the investments and payouts are made according to the methods of *GRInS PensionShares™*,
- no adjustment is made for inflation, so the income figure may buy less than the same dollar amount today
- the Benchmark currently covers only 1 to 30 years, so the Age number is always adjusted up to be at least 37.

If you retire earlier or later than the standard age, your spouse is a different age, or you are single at retirement, the payout will be adjusted. Click here for a more precise calculation.

Fig.12

1 Background Information

|  | Yourself | Spouse |
|---|---|---|
| Birth Year (Leave Spouse year 0 to calculate only for yourself) | 1969 | 1972 |
| Presumed Retirement Age (Social Security full retirement age) | 67 | 67 |
| Your Expected Retirement Age | 65 ◆ | 65 ◆ |
| Retirement Year (For simplicity, we assume the same year for both) | 2034 | |

← 1301

2 Benchmark Value Now / Value Later

This investment now [ $1,000 ] is approximately equal to this monthly retirement income [ $21.49 ] ← 1303

Enter an investment amount to see the Benchmark monthly retirement income, *or*, enter a retirement income to see the current investment required to guarantee that incom

Fig. 13

3 How GRInS PensionShares™ make this work

You can use PensionShares Funds to lock in a minimum retirement income. Step by step:

1. Select a Fund maturing near the time you expect to retire. — You can switch to a Fund with a different maturity if you later change your mind.

2. Buy shares in that fund, or direct your retirement plan to buy shares with your paycheck withholding. — You'll always know the target value per share and the current value. The value can change daily, but the target does not.

3. During the year or so before the fund matures, you can choose whether you'd like to take the share value as a lump sum, as monthly income for life, or a combination. — The monthly income is based on your age(s) at the time you begin receiving monthly payment. It is likely that you can get a monthly payment that is higher than the minimum value shown in this calculator.

4. Before the Fund matures, you can buy more shares or redeem your shares for their value. — An early redemption fee may apply.

*PensionShares* Fund maturing in year  [ 2034 ]

Current estimated price per share  [ $ 43.25 ]

Estimated yield to maturity  [ 5.42% ]

Target value per share  [ $ 210.88 ]

Target minimum monthly pension payout per share  [ $ 0.93 ]
 (Adjusted for actual age and number of beneficiaries at conversion)

Fig. 14

METHODS FOR ISSUING, DISTRIBUTING, MANAGING AND REDEEMING INVESTMENT INSTRUMENTS PROVIDING SECURITIZED ANNUITY OPTIONS

CROSS-REFERENCE TO RELATED APPLICATION

This application is a continuation in part of U.S. Patent application Ser. No. 10/273,542 filed Oct. 19, 2002 and further claims the benefit of U.S. Provisional Patent Application Ser. No. 60/453,164 filed Mar. 10, 2003 and U.S. Provisional Patent Application Ser. No. 60/519,104 filed on Nov. 12, 2003. The disclosures of each of the foregoing applications are hereby incorporated herein by reference.

BACKGROUND OF THE INVENTION

Until the last century, Americans generally worked as long as they were able and relied on their families for support in old age. But over the course of the last 100 years, we have gradually come to expect an independent retirement at or around 65 years old. These new expectations are the product of government programs (primarily Social Security) and the defined benefit plans, or pensions that have been widely provided by employers. Pension plans typically reward years of service with secure retirement benefits and, from the employee's perspective, retirement is funded almost invisibly. Employers oversaw the investment of pension funds and assumed the market risk.

Pension plans have several drawbacks for employees and employers alike: the benefits are not portable, and may be lost when an employee leaves the company; employees have no control over or access to their benefits before retirement; the pension fund could fail if the employer becomes insolvent; and the employer's profits include not only the results from business operations but must reflect the employer's pension fund's investment losses as well. In recent decades, "defined contribution" plans have largely displaced pensions. These plans are sponsored by employers but are funded voluntarily by employees. Their strengths include: ease of participation; tax-deferred contributions by employees; full employee ownership (vesting) of their own contributions; portability when changing employment, either to other plans or to Individual Retirement Accounts (IRAs); flexibility in the amount and timing of contributions; borrowing privileges; and choice of investments.

Through defined contribution plans, employees gained ownership and control of their retirement funding, but assumed complete responsibility for saving enough and obtained no shelter from investment risk. Employees like the control, and employers like their reduced responsibility and risk.

A growing number of policy makers see the shift to defined contribution plans as harmful to employees because most save too little, can't adequately forecast how much money they will need, and often manage the investments they do make poorly. Defined contribution plan participants want to know what to expect for income in retirement, but with self-direction they don't know how much to save or how to invest. Retirement calculators have proven ineffective, and investment advisors have not been effective or available to give confidence.

While guaranteed investment products, such as deferred annuities and guaranteed investment contracts, are available today, they are intimidating and complicated from the buyer's standpoint.

Deferred annuity contracts are typically sold in exchange for a lump sum premium, possibly with a contract to make additional payments until retirement, and grow at variable rate (sometimes with partial guarantee of rate) until retirement. Annuity contracts typically make payments for single life, joint life, or for period certain, with other options for minimum payout and recovery of some amount of cash value. While these features are desirable, conventional deferred annuity contracts exhibit most if not all of the following significant disadvantages: the rates of return is either not guaranteed, or guaranteed only for a short term; annuity contracts are typically complex and hard to understand, making it difficult for most investors to make the sound choices needed to properly fund their retirement; annuity contracts are not liquid and may only be exchanged for a sum which is aptly named the contract's "surrender value;" annuity contracts cannot be altered or exchanged to provide a different maturity in case the investor's seeks earlier or later retirement or otherwise changes plans; and annuity contracts are subject to insurance regulations that vary from state to state, adding overhead and complexity.

Note that savings objectives other than retirement funding are well matched to the deferred annuity structure, including education funding. We will also show that estimating the theoretical price and returns of financial instruments in which the purchaser can have a high confidence of a particular or a minimum result is useful in financial planning and in understanding the nature and impact of variable results from riskier investment strategies.

In a defined benefit plan (pension plan), there is a party that implicitly guarantees the performance of the investments set aside to fund the liability represented by the future benefits, and that guarantees the payouts that derive from those investments. The employer or sponsor of the plan expects the value of labor to meet or exceed the total costs of compensation, including the pension plan. In a defined contribution plan, there is no party that will make such guarantees, unless it has a fair chance of making a profit in return for the guarantee. To provide a pension replacement vehicle in a defined contribution plan, you must have a guarantee of a minimum rate of return and a minimum conversion of accumulations to payouts (or in the absence of absolute guarantees, a rate of return and conversion in which you can have high practical or statistically measurable confidence). If you know the minimum return and the minimum conversion, then you can express a target or minimum income that will be provided for any given amount today.

It is accordingly an object of the present invention to combine the best features of defined benefit and defined contribution plans in order to provide secure returns, portability, and access in an investment product that may be readily understood by investors and that provides a defined benefit that is structured to fit easily into defined contribution plans and the channels that market and service those plans.

SUMMARY OF THE INVENTION

The present invention takes the form of a method for issuing a "Pension Share", which may take the form of a security or a contract, and for managing the investment which funds the obligation represented by the Pension Share. The management process consists of an accumulation process and a payout process. The accumulation process seeks to meet or exceed a particular net asset value at a specified future maturity date. The payout provides the holder of the Pension Share with the option to obtain either a lump sum cash payment or a lifetime annuity, the terms of which are specified by the Pension Share instrument (e.g. Paying the holder $1 per month per share for the life of holder). Pension Shares can be purchased or redeemed daily at a published net asset value (NAV). Since individual Pension Shares mature at a specified date, they may be exchanged for other Pension Shares having a different maturity.

A Pension Share as contemplated by the invention incorporates a "Normalized Annuity Option" (NAO) which is a security or contract that gives the NAO holder the right to purchase a life annuity of specified terms at a defined date in the future for a predefined price, adjusted by age, etc., but not adjusted by population mortality assumptions or interest rates. The NAO can be thought of as a call option on a defined annuity product, or, financially, as an interest rate put option and a call option on a population longevity index.

In the past, insurance companies have offered deferred annuities and life insurance policies that routinely contained an option permitting the holder to take either a lump sum payment or to convert to a payout annuity with adjustments and at a guaranteed rate. However, the option is not to be securitized, i.e., split out as an instrument on its own. The packaging of the option as a securitized instrument is important because it facilitates the creation, issuance and marketing of securities and/or insurance policies which incorporate the securitized annuity option.

In accordance with an important feature of the present invention, the securitized annuity option clearly reveals the present value of the future choice. The NAO becomes an asset, not simply a cost, and the purchase price is set by market conditions and thus 'discovered' and made available to both buyers and sellers to inform their decision making and planning. In contrast, prior deferred annuity products hide the value and do not make that value available to policy holders. Should the embedded annuity option have a market value, the holder cannot realize it except through obscure or complicated arbitrage.

The securitization of the annuity option provides significant advantages, such as standardization, fungibility, transferability, and preserves the 'anonymity' of the holder until exercise. The securitized annuity may be advantageously offered in the form of a mutual fund although, as described in more detail below, specific preferred methods of issuing and managing such mutual fund Pension Shares may be employed to comply with applicable regulations while preserving the efficiency and advantages provided by the securitized annuity option.

When the accumulation contemplated by the invention is embodied in mutual fund shares, it may be advantageously implemented using an "internalized longitudinal collateralized bond obligation" (LCBO). In the LCBO, a portfolio of corporate bonds packaged to make a new Asset Backed Security, securities are tranched by date to match the maturity dates of the accumulation, thereby simplifying the management of the funds in the face of changing interest rates.

The general case is that any financial instrument, including a Pension Shares instrument, which evidences an obligation (which may be called a "security," "contract," "account," or "insurance policy") that has a minimum rate of return during accumulation and a minimum rate of conversion of the accumulated value to a payout allows you to relate a future payout as a current value. This gives meaning to savings that instruments with no minimum guarantees cannot offer. In particular, accumulated savings can be reported to the saver as a current value and as a future income, which aids in financial planning and gives confidence to the saver. While estimates can be made of the future income derivable from investments that do not have a minimum return or conversion rate, such estimates leave unanswered the impact of the variance of returns, and there can be substantial probabilities of underperforming the estimate.

Unitizing the relation of future income to current values, whether as a share, unit, or an abstraction such as "$1/month for life" reveals the price now of income in the future, which makes it obvious how to trade off current consumption versus future consumption. Finally, instrumentalities that are liquid, i.e., where the saver can add to or withdraw from the accumulated value, makes the value of the obligation understandable to, and gives control to, the saver.

These and other features and advantages of the invention will become more apparent through a consideration of the following detailed description. In the course of this description, reference will be made to the attached drawings.

BRIEF DESCRIPTION OF THE DRAWINGS

FIG. 4 shows the distribution of payouts estimated by applying historical interest rates;

FIG. 5 shows a simulation of results for investing $1,000 for 20 years in a portfolio with a mean return of 8% and annual standard deviation of 12%;

FIG. 12 shows a Web page form displayed by a "Spend It Or Save It" calculator which enables a consumer to compare current dollar savings with the future pension income those savings will provide;

FIGS. 13 and 14 show Web page forms for a more detailed retirement income calculator.

DETAILED DESCRIPTION

Overview

Figure 1:
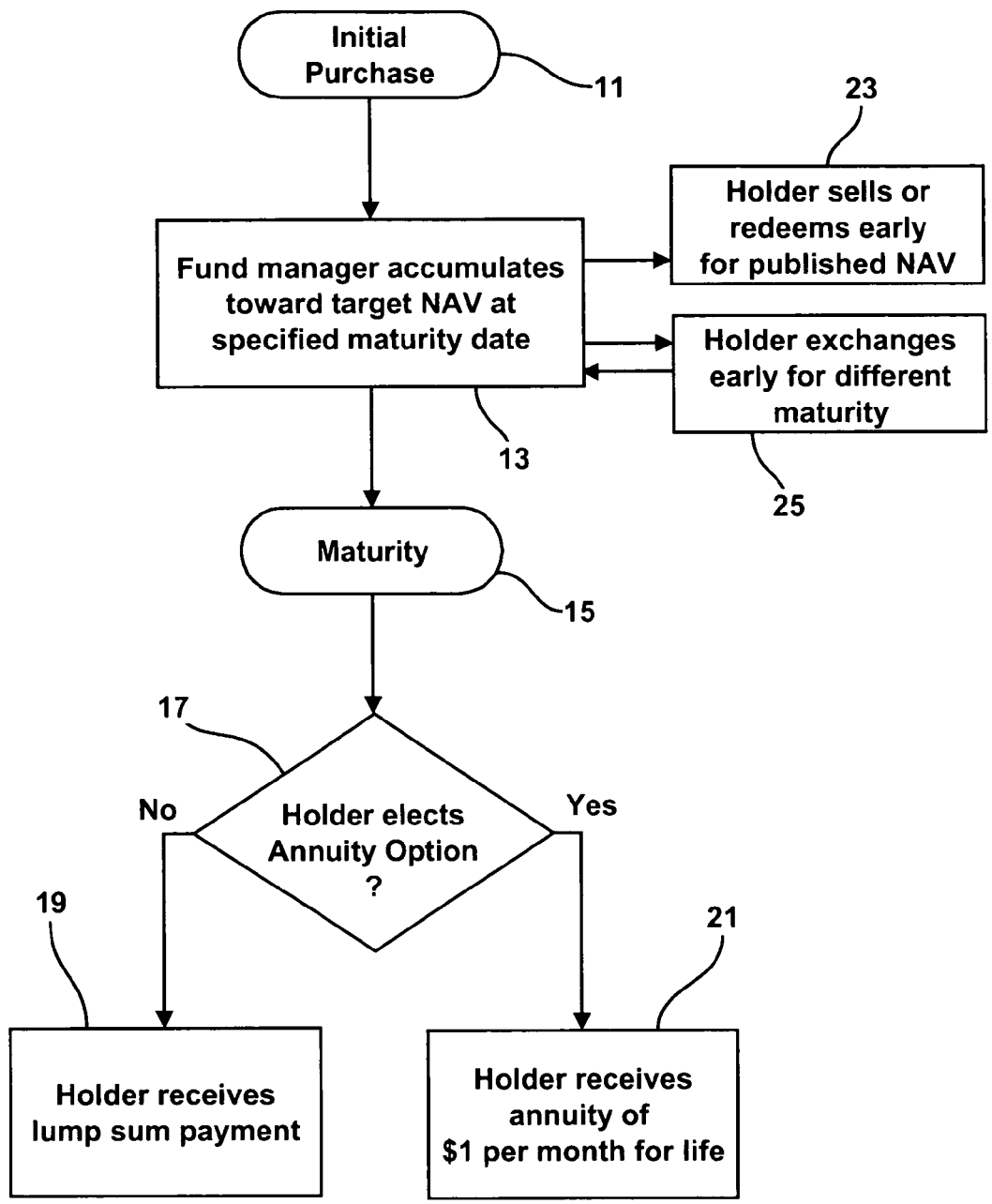
FIG. 1 is a flow chart showing the method or accumulating and paying out a Pension Share which provides a Normalized Annuity Option in accordance with the invention.

A "Pension Share", which may take the form of a security or a contract, is issued to an initial purchaser as seen at 11 in FIG. 1. The funds which secure the obligation represented by each pension share are managed by a process consisting of an accumulation process and a payout process. The accumulation process shown at 13 seeks to produce a particular net asset value at a specified future maturity date 15. The payout provides the holder of the Pension Share with the option at 17 to obtain either a lump sum cash payment 19 or a lifetime annuity 21, the terms of which are specified by the Pension Share instrument (e.g. Paying the holder $1 per month per share for the life of holder) when issued at 11.

Pension Shares can be purchased or redeemed daily at a published net asset value (NAV) as indicated at 23. Since individual Pension Shares mature at a specified date, they may also be exchanged for other Pension Shares having a different maturity as shown at 25.

The summary that follows subdivides the methods by which Pension Shares are issued, funded and paid out into three phases: The accumulation process 13, the maturation process that occurs at 15, and the payout process at 17, 19 and 21. Each of these phases is then further subdivided into its component steps. In the course of this summary, certain terms are defined which are used in the description that follows. In addition, the summary points out available alternative methods as well as considerations which bear upon the selection of the preferred methods.

As used here, the terms "share" and "unit" mean the same thing: a share, participation, claim against the assets, or other interest in an issuer or in property or an enterprise of an issuer.

A Pension Share is an investment product that is packaged as shares or units. More specifically, a Pension Share may take the form of a contract, but is preferably a "security" as that term is used in Article 8, Investment Securities, of the Uniform Commercial Code. More specifically, the term "security" as used herein means a share which is:

(i) represented by a security certificate in bearer or registered form, or the transfer of which may be registered upon books maintained for that purpose by or on behalf of the issuer;

(ii) one of a class or series or by its terms is divisible into a class or series of shares, participations, interests, or obligations; and (iii) which (A) is, or is of a type, dealt in or traded on securities exchanges or securities markets; or (B) is a medium for investment and by its terms expressly provides that it is a security governed by Article 8 of the Uniform Commercial Code.

In accordance with the invention, issuer of a Pension Share promises to pay to the holder of the security at a stated maturity date either a predetermined lump sum payment or, in the alternative and at the option of the holder, to pay a sequence of predetermined annuity payments at defined times. Pension Shares are issued to holder in advance of the maturity date in return for a purchase price payment. Pension Shares are fungible, their ownership is not confined to natural persons, and they may be bought, sold, exchanged, and redeemed by the current holder.

Insurance products are contracts that can simulate many features of securities. For example, a variable annuity can work like a mutual fund, with investments held in a separate account, insurance products can even include direct investments in securities, and net asset value pricing (NAV) can be simulated with market value adjustment (MVA) procedures defined in the product. Similarly, securities can simulate features of insurance. For example, put and call options are explicitly treated as insurance instruments; structured securities and mutual funds can have external guarantees, such as 'capital preservation funds' that guarantee your initial investment back; the NAO provides conversion to annuities. Because of this convergence of features, each type of product can be subject to dual insurance and securities regulation, but the external packaging of the product remains either insurance or security.

While the security packaging is preferred for Pension Shares, an insurance product can be constructed that provides most of the same benefits as the security. In the U.S., deferred annuity products have a tax deferral characteristic that the security version would not have outside of a tax-qualified retirement account. For example, a deferred annuity could be configured to provide the Pension Shares features of: sold in units of benefits (such as the $1/month/unit option at maturity) with a target unit lump sum value, flexible purchase at net asset value or a published buy and sell price, flexible redemption before maturity at net asset value or the buy and sell price, maturity easily changed or units exchanged from one maturity to another. Such a deferred annuity product would be further enhanced by holder anonymity during accumulation (e.g., removing features such as a death benefit that tie the contract to a particular holder, invade privacy, or otherwise increase the cost of the contract). The product could also be enhanced by using an NAO to represent the guaranteed annuity conversion rate of the product. The NAO has the advantage that its price can be included in the net asset value unit price or the buy/sell price, thus revealing the value of the option as an asset. Without the NAO, the traditional practice is that the cost of providing the option is revealed as an expense of (fees charged to) the product, which can leave the underwriter in flexible purchase contracts vulnerable to the annuity option being 'in the money' at maturity. Similarly, the holder cannot easily extract the economic value of an in the money option if he does not want the annuity.

As noted above, the methods by which Pension Shares are initially issued, funded and paid out may be subdivided into three phases: the accumulation process, the maturation process and the payout process. Each of these three phases is summarized below.

The Accumulation Process

The manner in which funds are accumulated to meet the obligations defined by a Pension Share is characterized by both the nature of the entity issuing the security and by the investment process that is employed to accumulate funds to meet the obligations represented the by the Pension Share.

The entity issuing the Pension Shares is preferably a "transparent issuer" but may be an "opaque issuer." When Pension Shares are issued by a transparent issuer, the shares or units represent proportional claims on the assets held by the issuer, such as a mutual fund or collective trust. When Pension Shares are issued by a transparent issuer such as a mutual fund, they may be readily distributed through conventional channels, such as IRA accounts. However, mutual funds have higher fixed costs and are more closely regulated than are obligations from an opaque issuer. A transparent issuer must hold contracts or obligations from an external entity, such as an insurance company, in order to make accumulation guarantees. Shares that represent obligations of an opaque issuer, such as an insurance company, are backed by the issuer's own capital, and accumulation guarantees can be relied upon only to the extent of the issuer's capital and resources. Opaque issuers that market Pension Shares have the opportunity for higher profit, since they can keep the residuals if they manage well, but they bring single-firm risk to investors, since failing to manage well will create losses for the firm and it may default on its obligation to the investors. There can be hybrid issuers, such as an insurance company (opaque) using separate accounts (a transparent vehicle) to maintain the Pension Share investment.

The accumulation process which the issuer follows in order to meet the obligations of an issued Pension Share security is selected based on the whether the Pension Share, as issued, specifies that the lump sum amount to be paid is a fixed target, an indexed target, a variable target, or a variable target with a minimum.

If the lump sum is "fixed target," the lump sum amount a Pension Share obligates the issuer to pay at maturity is intended to be met exactly and represents a fixed rate of return from the initial purchase of a Pension Share to maturity. A transparent issuer of a fixed target Pension Share will accordingly invest in a portfolio with a duration that matches the time to maturity. This can be done with an "immunized portfolio," with instruments of fixed duration such as zero-coupon bonds, or with investment products with sequential maturities that create the effect of zero-coupon instruments by internal stripping.

A Pension Share with an "indexed target" is like a fixed target, but the target amount is adjusted in a defined way in accordance with changes to an index value, such as an inflation index, to preserve the purchasing power of the target amount to be paid at maturity. When the Pension Share obligates the issuer to pay an indexed target amount, an accumulation process is chosen which incorporates investments whose value is more likely to track the selected index, such as U.S. Treasury Inflation-Indexed Notes and Bonds.

A Pension Share which defines the lump sum payout as a "variable target" does not set a return that can be predicted or managed with any certainty, but rather defines an investment process. Examples of the accumulation process for a variable target payout include investing in stocks or stock indexes.

A Pension Share may define a "variable target with a minimum" by defining a guaranteed minimum payout that is intended to be met or exceeded if the defined investment process performs well. To meet the obligations imposed by a variable target with a minimum, the accumulation process may take the form of a combination of investing in stocks or stock indexes and stock put contracts, index puts, or portfolio insurance wraps.

When an indexed target, variable target, or variable target with a minimum is used, it is beneficial to the holders to either: a) adjust the number of NAOs per share or unit (buy buying additional NAO units proportionately as performance in excess of the minimum is realized, or b) issuing new shares to holders as a distribution in proportion to the performance in excess of the minimum, or c) using NAOs where the payout and strike are adjusted proportionally with the excess performance.

The Maturation Process

The manner in which a Pension Share matures depends both on the nature of the "maturity date" and the nature of the "conversion process" which occurs at the maturity date.

A Pension Share may mature at a fixed maturity date, or at a variable maturity date. When Pension Shares mature at a fixed date, processing at the time of liquidation is significantly simplified and the Pension Shares need not define the manner in which the payout is adjusted to provide a variable maturity. Different Pension Shares may have different fixed maturity dates and, a holder can exchange shares having one maturity for shares having a different maturity if the holder's planned time of retirement changes. Alternatively, the holder may redeem shares early to "cash out" and possibly purchase a different investment product if the holder's plans change. Thus, the simplification provided by a fixed maturity date need not significantly restrict the flexibility that the holder enjoys.

At the maturity date, the holder receives either a lump sum payment or, in the alternative, converts the lump sum value into a series of timed payments. The lump sum amount may take the form of target amount, a variable amount, or a guarantee amount.

A range of dates before and/or after the maturity date may be allowed for converting the lump sum into payments. The range is desirable to allow individual holders to adapt the payout to their personal situation. In case a range of conversion dates is allowed, additional constraints may be imposed to specify any changes or adjustments to the conversion process. For example, before maturity the accumulation process may not have built up a value equal to the lump sum, so the payout would be adjusted pro rata. In practice, if the share value is higher than the lump sum, adjustment higher than the guaranteed payout would not be permitted, to protect the NAO underwriters from the risk of accumulation overruns.

The target amount is the value resulting from the accumulation process used to manage the fund as described above with the intent that the lump sum will have the target value at maturity, but the target may not be met since the issuer is a transparent issuer and has no resources other than its defined assets to make up any deficiency. As noted above, the target amount paid at maturity may be a fixed target value, an indexed target value, a variable target value, or a variable target value having a "guaranteed" minimum.

A variable amount lump sum payment is simply the accumulated return from the initial investment and has no relation to a target amount, guarantee or "defined amount" (described below).

A guarantee amount may be either a defined money amount or a defined minimum amount (which a transparent issuer must secure with insurance from a financial guarantor, or which is backed by the full faith and credit of an opaque issuer). A defined minimum amount may be exceeded, but only the stated minimum value is guaranteed.

At maturity, the holder may elect to convert the lump sum amount into one of three possible alternative forms: a payout security (that is not contingent on the life of the holder); an annuity contract; or an option to obtain an annuity contract.

The Payout Process

The amount of money needed to fund the payout of a Pension Share at its maturity (here called the "defined amount") is calculated or estimated as a function of:

a. the payment amount,
b. the initial payment adjustments,
c. the periodicity of the payments,
d. the conditions under which payments continue, and
e. estimates of likely future interest rates and mortality curves available at the time of conversion.

The "payment amount" may be simply a fixed payment (a defined money amount that is constant for all payments). An incrementing payment in which successive payments increase a defined rate (e.g. 3% annually) provides some protection against inflation which is desirable as life expectancies continue to increase. Otherwise, even with moderate 3% inflation, the purchasing power of a fixed payment would drop in half between age 65 and 90; 90 is only about 1 standard deviation above median life expectancy for 65 year olds. An incrementing payment is easy to price and build, and is readily understood by Pension Share purchasers.

The payment amount may be an indexed payment where successive payments are adjusted based on an index, such as an inflation index. In the U.S., there are not many inflation indexed investments that can back or hedge COLA (Cost of Living Allowances) products, so such products tend to be expensive. Overseas, indexed investments are more common. Indexed payments are generally preferable to variable amount payments (in which successive payments are adjusted as a function of the performance of an investment portfolio) because indexed payments more effectively shield the holder from risk.

The Pension Shares may further define initial payment adjustments which, for life-based payments, are adjustments made using a defined table or mathematical function that makes actuarial adjustments to the initial payment amount. These adjustments are typically a function of data such whether the annuity is joint and survivor or single life, and the sex and age(s) of annuitant(s).

The Pension Shares payout process further defines the times at which payments are transmitted to the holders or beneficiaries (e.g. monthly, quarterly, annually, etc.) and the conditions under which payments continue, including a period certain (i.e. a defined number of payments) or preferably as a life annuity, which may be for a single life, or as "joint-and survivor" payments that when only one annuitant is alive (e.g. 50%, 75%, or 100% of the payment made when both are alive). A life annuity may be accompanied by a minimum cumulative payment or minimum number of payments.

At the time of conversion to an annuity, the holder is allowed to choose between single and joint-and-survivor plans, and whether or not there will be a minimum payment. This choice is one of the factors that affects the amount of payment which is to be made based on the defined value of the Pension Share at the time of conversion to an annuity. Note that, in the United States, retirement plans are required to default to spousal inclusion in benefits; consequently, a joint-and-survivor plan will be used unless the holder affirmatively chooses a different payout process. For simplicity, the preferred "benchmark" terms for payout by a single Pension Share would provide a payment of $1 (one dollar) per month for the joint-and survivor's lifetime.

DESCRIPTION OF THE PREFERRED EMBODIMENT

The present invention takes the form of a method for issuing a new kind of security called "Pension Shares." Pension Shares can be thought of as bundling two components:

1. A fixed terminal value component guaranteeing a predefined lump sum value per share at maturity (analogs are zero-coupon bonds or long-term bullet GICs);
2. A Normalized Annuity Option (NAO) contract guaranteeing that the lump sum value of the share at maturity can be converted to a joint and survivor life annuity paying $1 per month per share, with the actual payout adjusted based on the ages of the annuitants at conversion. In other words, this is a security that represents a unit of guaranteed annuity purchase rates.

"Normalized" refers to the fact that the terms of the NAO are based on circumstances that are hypothetical when the Pension Share is purchased, and defined so that a particular common case results in the $1 per month payout. The NAO contract component of a Pension Share is an "option" because the holder is not required to convert the lump sum into the annuity, and may choose instead to take the lump sum as cash.

The specifications for the Normalized Annuity Option (NAO) need to be both financially conservative and contractually conservative. The NAO should be 'financially conservative' in that it should be easy to value and not be subject to speculative extremes in pricing. The implied interest rate of the annuity can be high or low, but low is preferred so that the value of the NAO is a small part of the value of a Pension Share. While the outcomes will be essentially the same, the low rate assumption focuses the holder's attention on the rate of return to maturity without introducing a large element of speculation on interest rates at the time of maturity.

By 'contractually conservative' it is meant that the NAO contract delivered as a result of exercise of the option should be widely available, easy to understand, and writable in all regulatory jurisdictions where the Pension Shares will be sold.

In general, expect that the NAO will not be exercised. Instead, holders will tend to prefer either the lump sum or another payout product that better fits their particular needs, has a higher interest rate, includes variable returns or inflation indexing, or implements any of the dozens of other annuity features available. The NAO is included in Pension Shares because it:

a) Creates a floor or guarantee the holder can depend on;
b) Allows Pension Shares to be priced in a way that is more meaningful than other products (in other words, the share defines the benefit). This meets our goal of providing a defined benefit within a defined contribution plan;
c) Has the side effect of creating interest in guaranteed payout products among holders.

Pension Shares are designed to be attractive at all links in the defined contribution value chain, including the following benefits for NAO underwriters:

a) The price of a Pension Share includes a premium for the NAO underwriter;
b) The NAO underwriter has a new, very low cost institutional source of demand for annuities. The underwriter's other products will usually be attractive compared to the NAO annuity.

One feature of Pension Shares is that prior to maturity, an "assignment" process links holders to a single annuity underwriter for all of that holder's shares. This one-to-one retail relationship is an opportunity for the underwriter to market other investment or retirement payout products to the holder. There may be an exception to this, where the shares are pre-assigned when issued, in cases where the plan provider is, or is related to, an NAO underwriter. In that case, the pre-assigned underwriter would be subject to other constraints, such as a requirement to fulfill all demand from its provider.

A single NAO issuer can be used to advantage. Instead of assignment, all annuities are written by one underwriter, and the annuities are pooled by means of reinsurance. This spreads the risk of annuity default across many insurers, pooling that risk, and makes it true that all holders who take annuities face identical risk. Regulators will see that non-discrimination among holders is important.

Investment Policy and Procedures for Pension Shares

Pension Share portfolios are managed to meet a target net asset value at the defined maturity date which involves a number of challenges, particularly within the mutual fund structure as defined by the Investment Company Act of 1940.

Traditionally, mutual funds start with the initial investment, apply a process, and hope for the best. The process of funding Pension Shares instead starts at the end, with the benefit or result, and works backwards to determine what the initial investment should be.

Figure 2:
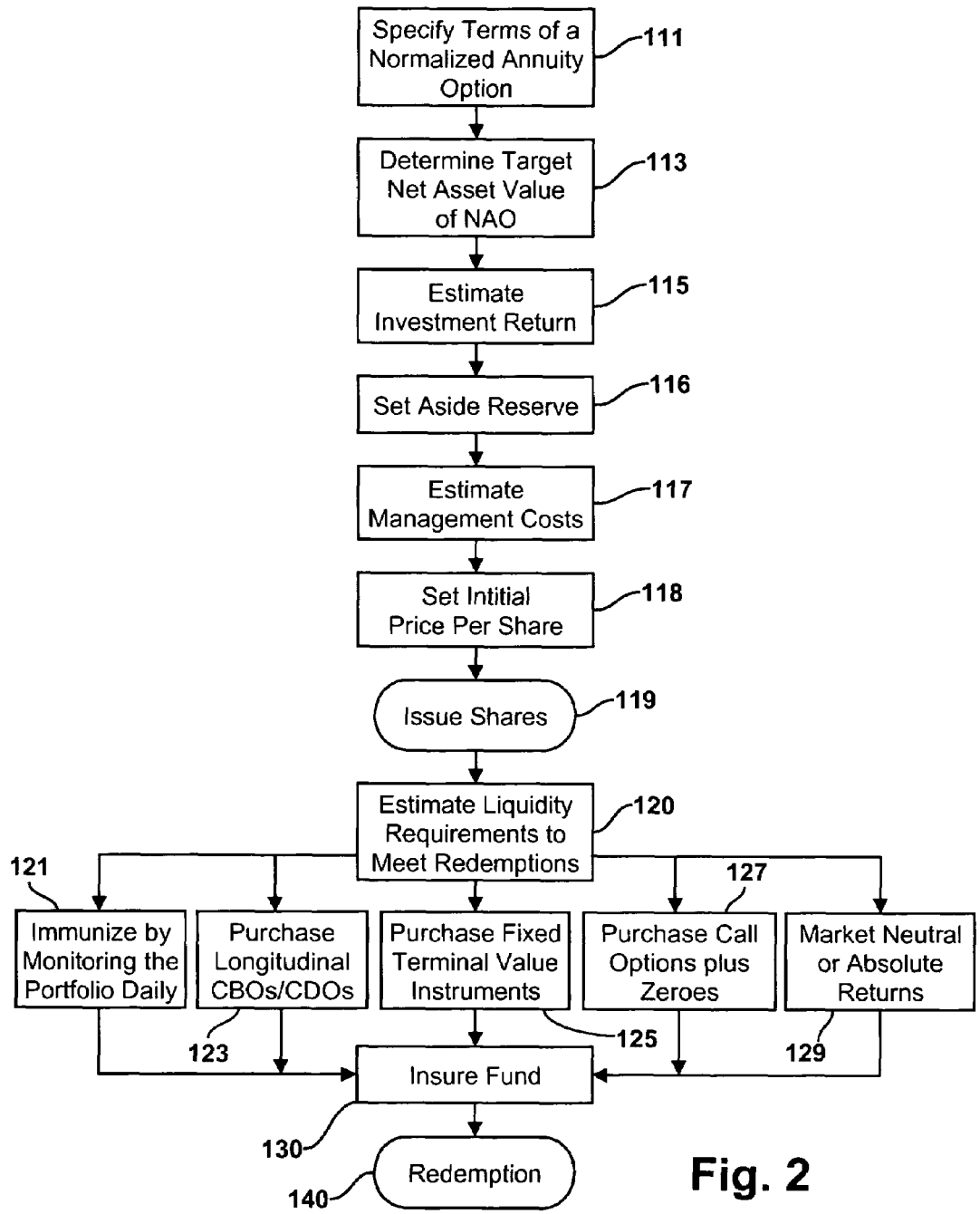
FIG. 2 is a flow chart which illustrates the accumulation process employed to securitize the annuity option.

The procedure begins, as seen at 111 in FIG. 2, by specifying the terms of the Normalized Annuity Option (NAO), an instrument (either a security or a contract) equivalent to the guaranteed annuitization feature of a deferred annuity. The NAO grants the owner of a Pension Share the right but not the obligation to buy a life annuity or other payout product on predefined terms at a date in the future regardless of market prices for such annuities at that time. The annuity terms which are to be established at step 111 include:

a) the maturity date (i.e., date of option exercise);

b) a payout table (payout as a function of the number of annuitant(s), their sex, age, etc.);

c) the annuity premium;

d) the legal features of the annuity contract to be delivered; and e) the underwriting fees, per annuity contract.

The important item for the portfolio manager is setting the annuity premium, since that establishes the target Net Asset Value (NAV) which is determined at step 113.

Working backwards from the target NAV, an accumulation process must be followed which is calculated to safely achieve the NAV. The investment return needed from inception to maturity, excluding expenses, is determined as shown at 1115. The net investment return must also include the risk of default and recovery in the investments through maturity, and account for the expenses of the guarantee, whether through the purchase of portfolio default insurance, through allowance for reserves, or both as indicated at 116. Some policy and style decisions will feed into these estimates as summarized below:

The fund may be administered by active management or alternatively by passive or indexed approaches. Passive management can reduce costs, and the ultimate performance of these products will be very sensitive to costs. Credit spreads historically range from too-low (risk underpriced) to too-high, so there should be opportunities for an active manager to stick with government securities when spreads are low and enhance returns with corporate bonds when spreads are historically high.

As discussed in more detail below, Pension Shares may be funded by (1) "risk-free" assets, (2) insured assets/portfolios, or (3) reserves, or a combination of these. Currently, peak yields are about 5.40% for 2024 Treasury STRIPS, 5.95% for FNMA 0s of '19, and about 7% for 20 year coupon AA financials. The horizon for credit or default swaps is currently limited to about 5 years, and there has been no market for insuring corporates for very long terms. While insurance for municipal bonds exposes 'inefficiencies' in the ratings and pricing of that market, it may be that the price of insurance for baskets of corporates would equal or exceed the spread. Internal reserving would be very efficient, but adds some uncertainty to performance and can make the yield to target NAV look low even if the yield to probable maturity NAV is competitive.

As indicated at 117, the cost of managing the fund, including shareholder servicing costs and the cost of fund administration, investment management, and transaction costs must also be estimated.

As seen at 118 in FIG. 2, the foregoing information may be used to calculate the initial share price, $P_0$, using the following relation:

$$P_0 = pv(V_m + R_m, m, r_g - r_x) + N_m$$

where the variables used have the following meanings:

$N_m$ NAO price for maturity pv( ) present value (future value, periods, rate per period)

$V_m$ target net asset Value at maturity $R_m$ dollar reserve for credit losses (defaults less recoveries) per share at maturity m number of years to maturity $r_g$ gross yield to maturity of the portfolio $r_x$ average annual expense expressed as a rate per year (alternatively, annual expenses may be accumulated to maturity and included in the reserve, $R_m$).

Fortunately for retirement products, the net of new share purchases minus redemptions is fairly predictable and usually positive. The fund's ability to meet its target NAV is impaired any time net redemptions caused assets to be sold at a value less than the value used in calculating the NAV (due to the spread between bid and asked prices for a security). An optimal cash level can be estimated, depending on the returns on cash relative to the next most liquid securities, the spreads in the prices of the next liquid securities, and the probable distribution of net cash flows into and from the fund. This impairment can be mitigated or eliminated with redemption fees (paid to the fund for premature share redemptions) as discussed in more detail below under the topic Redemption Costs in the section entitled Building Pension Shares. Currently, a 1% redemption fee until the last few years before maturity appears to be more than adequate to protect the portfolio from impairment. As maturity approaches, the redemption fee can be reduced as trading spreads narrow and portfolio liquidity increases.

Circumstances which unfold after the Pension Share is issued at 119 must also be taken into account.

As seen at 120, the fund manager must estimate liquidity requirements to meet normal redemptions to a given certainty (e.g., two standard deviations). The liquidity requirements estimated at 120 indicate the target allocation to cash and highly liquid securities which is to be maintained in the portfolios Five alternative methods have been developed for managing the fund during the accumulation process as indicated at 121, 123, 125, 127 and 129 in FIG. 2.

Method 1: Immunization

This method shown at 121 uses traditional techniques for matching the assets held by the fund to the 'liability' implied by the target NAV and maturity date. The duration of the portfolio will be managed to equal the time to maturity, so the ultimate value of the portfolio will not be affected by changes in interest rates along the way.

Using the traditional techniques, a prototype allocation within the portfolio includes the following components, listed in order of decreasing liquidity:

| Instrument | No Res. Or Ins. | Res./Ins. |
|---|---|---|
| Liquid Securities | | |
| Cash and equivalents | 1% | 1% |
| Treasury and agency | 84% | 9% |
| Corporate bonds | | 75% |
| Illiquid Instruments | | |
| Bullet GICs or similar | 15% | 15% |

In the table above, both the Corporate Bonds and the Bullet GIC (Guaranteed Investment Certificates) or similar instruments are typically high quality, investment grade, and the GICs are without put or redemption features.

The traditional immunization strategy illustrated at 121 requires that the portfolio be constantly monitored and that its composition be adjusted with changes in the term structure (yield curve). With a static fund that has no cash flows, the manager would need to periodically buy and sell securities to bring the portfolio back to the proper duration. Fortunately, with normal net inflows, the manager can be more efficient by buying additional securities that correct the portfolio's duration without also having to sell other securities, thus reducing turnover and trading costs.

The portfolio manager also needs to monitor credit quality. Unfortunately, simply selling any asset when it is downgraded cumulatively has the same effect as defaults since the price of the asset drops in the event of, and even before in anticipation of, a downgrade. The manager will need to make judgments informed by quantitative models of the relative value of holding a possibly defaulting asset versus immediately realizing a loss. This strategy will be controlled by requirements of any insurance or credit derivatives used to mitigate default risk, and by the rating agencies if the funds are rated.

Other than treasury and agency securities, the portfolio must be diversified across sectors of the economy. There is no need to invest internationally since the liability is domestic and denominated in local currency. Bullet GICs are used get exact duration matches, to obtain management and portfolio diversification as a claim on general accounts of various insurers, and possibly a premium return for the long-term commitment (lack of liquidity).

Under the strategy shown at 121, the portfolio is monitored daily (policy enforcements can be performed in real time) in order to:

a) maintain liquidity
b) keep allocations within predetermined policy limits and regulatory limits
c) maintain duration match within limits
d) keep portfolio diversified
e) monitor and maintain credit quality.

Method 2: Longitudinal CBO/CDO

The second strategy, shown at 123 in FIG. 2, is to use a Collateralized Bond/Debt Obligation structure, where a pool of bonds is shared among the funds in the series (and perhaps external participants). But instead of tranches based on repayment priority, the tranches are based on time: coupons and principal repayments are assigned to the tranche matching the year (or other period) in which they occur. Owners of the tranches therefore get a diversified instrument with a fixed duration (zero convexity). This process is much like 'stripping' of treasuries, with shares of each tranche becoming zero-coupon instruments. Further, this approach scales well, since you can have one very large portfolio instead of 15 to 20 small portfolios. There can be more or fewer portfolios, for longer or shorter terms, based on market acceptance and costs, The scale makes management more efficient and makes diversification easier. Insurance wraps and default swaps can be used to further enhance the effective quality.

An important additional innovation is the "internal LCBO", where the funds in the series cooperate to become collectively the CBO as described below under the topic "Issue Level Stripping" in the section entitled "Building Pension Shares." Here, a long maturity fund buys bonds that mature in the same year as the fund. It then 'sells' the coupons to the shorter maturity funds by means of forward contracts. Each fund still has responsibility to maintain liquidity, but duration management is a much reduced issue. Under the longitudinal CBOs/CDOs approach shown at 123, all fund portfolios are monitored simultaneously to:

a) maintain liquidity of each fund
b) keep allocations within predetermined limits
c) keep portfolio diversified
d) monitor credit quality
e) match maturities and coupons to the maturities of the "assigned" funds.

Each fund is still likely to have assets that it does not 'share' or that it partially shares with other funds, simply because the flows into the funds will vary by fund maturity day to day and over time. Since this approach is novel, software to help optimize the allocation of maturities across all funds simultaneously will be developed.

In the LCBO, a portfolio of corporate bonds packaged to make a new Asset Backed Security, securities are tranched by date to match the maturity dates of the accumulation, thereby simplifying the management of the funds in the face of changing interest rates.

Collateralized bond obligations may have "latitudinal" tranches (conventional repayment priority tranches) as well as time-based ("longitudinal") tranches as described above. By employing latitudinal tranches, the CBO does not require insurance or other schemes to be able to issue high quality securities (i.e., a high probability that the securities will be paid off in full).

Method 3: Fixed Terminal Value Instruments

As seen at 125, a third mechanism for funding Pension Shares is to purchase Fixed Terminal Value instruments. FTVs are contracts like bullet GICs, except they are standardized, reinsured for uniform high credit quality, and easily tradable and liquid. FTVs may be traded on an exchange formed to be the issuer and clearing facility for FTVs. In this case, the work of portfolio management would be almost entirely distributed to the underwriting members of the exchange. Bullet GICs with redemption or put features may serve as FTVs.

Insurance

There is ample precedent for using insurance wraps to create guarantees for funds and products around corporate debt, but not for the long time horizons envisioned for Pension Shares (20 or more years, versus 5-7 years for guaranteed rates in fixed annuities, capital preservation mutual funds, default swaps, etc.). Insuring municipal obligations is a mature industry that demonstrates long-term insurance, but municipalities are arguably more stable than corporations.

That said, it would appear that there is opportunity to insure individual corporate credits or baskets of corporates.

For high-quality and investment grade corporates, the credit spread usually more than compensates for observed defaults over long periods. The same is not clear for high-yield (junk) bonds, but these are not under consideration for Pension Share products. At any rate, spreads vary over time from questionably thin coverage for default risk to comfortably rich coverage for a diversified portfolio. As discussed below, this credit spread may be split with a financial guarantor in exchange for insuring the portfolio against defaults.

Lacking long term insurance structures or instruments, other approaches may be used to get the same effect. For example, intermediate term credit spread swaps may be chained to achieve the effect of a longer term default swap. In essence, a deteriorating credit would see an expansion in spread before actual default; if the credit is deteriorating, the loss would be offset by the swap, allowing the manager to sell that credit when the swap expires without incurring the entire loss.

Method 4: Index-Participating PensionShares

Pension Shares would ordinarily consist of "zero coupon" instruments that pay no interest before maturity (or a portfolio otherwise managed to have the effect of meeting the target value as if were invested in zero coupon instruments), and a Normalized Annuity Option (a security or a contract than assures the delivery of annuity contracts to shareholders).

There is a strong interest in the marketplace for guarantees (as Pension Shares provide in the target value and the target annuity conversion rate). But there are also strong interests in inflation protection and "upside", i.e., participation in the "excess returns" of equity markets (average returns that are larger than the average, lower variance returns of assets such as bonds or cash). There is a further interest on the part of mutual fund management companies to not have large series of funds, since there are large fixed costs for starting and maintaining a mutual fund.

Pension Shares that have a "variable target with a minimum" by defining a guaranteed minimum payout that is intended to be met or exceeded if the defined investment process performs well. To meet the obligations imposed by a variable target with a minimum, the accumulation process may take the form of a combination of investing in stocks or stock indexes and stock put contracts, index puts, or portfolio insurance wraps.

A method for building such a product includes:

1. At the beginning of an investment period (which lasts perhaps one to five years), the fund purchases FTVs (Fixed Terminal Value instruments) for the expected term of the investment period such that the FTVs mature with a value equal to the initial fund investment (e.g., if FTV yield to maturity is 5% and the period is 5 years, the fund purchases $0.78 of FTV for each $1 invested in the fund).

2. The remainder of the investment is used to purchase equity index call options (or a call-option-like derivative that participates in the positive returns of some security or asset class with no possibility of a negative value). If the equity index has a negative return by the end of the period, the fund is still worth at least its original value because of the FTVs. If the equity index has a positive return, the call option will have a positive value that is added to the value of the FTV.
   a. Other strategies can be used instead of call options plus FTVs, including "dynamic hedging"
   b. So far this is the same as structured products, such as MITTS (Market Index Target-Term Securities$^{SM}$), index-linked CDs, "principal protection" funds or "principal preservation" funds.

3. An Index-Participating Pension Shares (IPPS) fund would also hold NAOs in its portfolio. These NAOs would have a maturity the same as the investment period, but would allow exercise at any time (NAOs as earlier described allow exercise only at maturity or near maturity, although that is not a necessary limitation). Thus, an IPPS could be perpetual, with no set maturity date.
   a. Such a product cannot guarantee a minimum share value except at the end of an investment period, but the amount of downside excursion of value is practically limited (the FTVs will approach the original value, and the call option will always have some value until the end of the investment period).
   b. At the beginning of a 5-year period, and assuming a strategy including the use of 5-year S&P 500 Index call options, an immediate 20% drop in the index would imply a drop of 50% or less of the value of the call options, so the IPPS value would drop 11%, or less, while offering a 'guaranteed' return of 2.36% per year to maturity (up from 0% guaranteed at inception).
   c. In this example, at the end of the 5-year period, the IPPS fund shares would be worth the initial investment plus about 75% of the increase of the S&P Index.

4. Variations can include:
   a. A variable investment period, where the fund manager is allowed to 'reset' the fund according to his judgment and start a new 5-year period (or whatever) before the prior period has ended. This allows him to 'lock in' a portion of the gains that may have occurred. At a reset event, whether early or not, any gains realized can be distributed in the form of additional shares (necessitating the purchase of additional NAOs), which increases the eventual per-share benefit in terms of annuity income. (Actually, this distribution and adjustment can take place any time, such as every year).
   b. Guarantees or targets of some minimum rate of return. It isn't necessary to have a minimum return of 0%, but higher minimum returns necessarily reduce the amount of participation in the index.
   c. The index can be based on many things, including baskets of commodities, foreign currencies or investments, or cost-indexes such as an index of college expenses.

In this model, the FTVs can be inflation-adjusting, although there is a component of inflation protection in equities.

These new methods for Index-Participating Pension Shares allow more retirement saver problems to be addressed, including the desire for 'upside' and intrinsic flexibility regarding changing his expected date of retirement (and annuity conversion). NAOs can be more efficiently priced over short periods than over very long periods like 20 years (to the mutual benefit of the underwriter who incurs less risk and the shareholder who pays less for the guarantee).

Note that investment products like a Guaranteed Investment Contract (GIC) or stable value fund or account can be extended in this way. Given a minimum "crediting rate" (at least 0% but preferably higher) and a guaranteed annuity conversion rate option or NAO, the GRInS Effect is achieved by unitizing and/or future income denomination. While these fixed-income products do not have participation in the upside of equities or other indexes, they do have an upside in that the periodically set crediting rate can be higher than the guaranteed minimum used to calculate the minimum future income. Like IPPS funds, when the crediting rate is higher than the minimum, the future income can be adjusted higher through the proportionate purchase of additional NAOs or as a consequence of the higher minimum value at the time of annuity conversion.

Method 4 Generalization

An IPPS fund without NAOs is still a very useful concept, as it provides a risk controlled investment for its investors: participation in upside with a limitation of downside. Call this a COPP (Continuously Offered Principal Protection) Fund.

The general principal of an IPPS fund or of a COPP fund is to participate in upside, but have a NAV and a time defined in the future that holders can have confidence that the NAV will meet or exceed the target at that time. Treating the IPPS or COPP fund as having multiple subportfolios allows each sub-portfolio to have its own investment period. This is similar to a "laddered portfolio" of bonds. Similarly, a laddered IPPS or COPP fund will not have risk that follows the "sawtooth wave" or down-ramping of a non-laddered IPPS/COPP. This means that the investment characteristics such as expected return and expected risk are relatively consistent over time, rather than jumping at the end of an investment period. The effective time to the end of the investment period now becomes more a constant, and the investment responses more consistent over time. The portfolio need not be literally subdivided, but a management method that works the same as the combined effect of multiple sub-portfolios would also work.

Because Laddered IPPS or COPP funds have limited downside volatility, they are good vehicles for post-retirement investing. Just as volatility works for a saver during accumulation (additional investments benefit from dollar cost averaging), volatility is very dangerous during withdrawals (the effect of withdrawal when prices are low are magnified because the withdrawals consume a larger amount of the assets, which is then not available to benefit from a subsequent rise in values). Further, the methods of IPPS and COPP funds can be employed in systematic withdrawal plans to form the basis of a non-annuity payout, or employed in an annuity to pool the longevity risk for the benefit of the longer-lived pool members (i.e., like an annuity, payments cease upon death of a pool member, but the assets can then be used to further fund payouts of the surviving members). This gives upside participation in variable return markets, such as when the upside returns are tied to an equity index, while limiting or eliminating the risk of members outliving their assets' ability to produce income.

Method 5: Market Neutral or Absolute Returns Strategies

Investment management strategies other than immunized bond portfolios (as in Methods 1 through 3) and call options plus zeroes (as in Method 4) can be employed, such as market neutral or absolute returns. Market neutral is simultaneously selling short a portfolio of "overvalued" stocks that correlates with a long portfolio to neutralize market risk; absolute returns are more exotic methods such as shorting the stock while holding convertible bonds of the same issuer. These methods are employed on the supposition that the returns are greater than for long-only strategies with the same level of risk. In either case, if a party can be found who will guarantee a minimum return from either strategy at a cost such that some of the 'alpha' is preserved, then PensionShares products can be made that have higher returns than more conventional approaches.

These strategies may be employed directly by the investment manager, or indirectly through derivative securities or other contracts, including total return swaps.

Inflation Indexing

The U.S. Treasury does issue Treasury Inflation-Indexed Notes (commonly called "TIPS"). A few firms have issued inflation-indexed bonds. With the advent of CPI futures contracts, ordinary fixed income investments can be combined with CPI futures to allow the underlying portfolios to track inflation.

Reserving

A straightforward approach to meeting the target NAV when the ultimate return of assets cannot be guaranteed is to hold assets in excess of the target as indicated at 116. Simply, if the yield to maturity net of expenses indicates that $60 of assets now will meet the target of $200 in twenty years, given a 10% default estimate, $66 in assets could be held in reserve to allow for defaults and unforeseen adverse events and expenses. The advantages are simplicity, understandability and transparency (shareholders will see that this approach increases the likelihood of meeting the target, and gives them an opportunity for additional returns if the reserve is larger than needed). The downside to setting aside a reserve is that the apparent return of the shares to target NAV is reduced, and may not be competitive if the comparative analysis is superficial and does not account for default risk. Continuing the example, if net yield is estimated as 6.20% for 20 years, implying an initial price of $60 per share, an initial price of $66 (i.e., reserve of 10%) would appear to be a return of 5.71%. Worse, if after many years the reserve is completely intact, the return could appear to be negative, if for example the NAV rises to $210 and the announced target remains at $200. An insurance firm will operate under this model. As reserves are discovered to be actuarially excess over time, they can be taken as profits, or if the reserves are inadequate, then the firm makes up the difference and realizes a loss.

The yield to maturity with reserves is approximated by the formula:

$$Y_R = [(1+Y_G)^M (1-RD_M)]^{1/M} - 1, \text{ where}$$

$Y_R$ is Yield with Reserves,
$Y_G$ is Gross Yield,
$D_M$ is cumulative default rate over M years,
R is the Reserve Factor, or the multiple of the cumulative default rate to be reserved,
M is the number of years to maturity.

NAO Terms

The representative terms of the preferred form of normalized annuity option component of a Pension Share may be summarized as follows:

Maturity Date: Each Pension Share matures on June 30th of the maturity year for that issue. Adjustments to the lump sum and NAO for holders may be specified for holders who wish to redeem or convert their shares on other dates within the maturity year.

Initial Maturities: The first issues of Pension Shares would have maturity years over a range of years (e.g. a fifteen year range from 2008 through 2023). An additional maturity is added each year, or more if there is demand.

Lump Sum Amount: Each maturity may have a different lump sum amount specified. The lump sum amount is determined based on the cash needed to fund a normalized annuity.

Payout Adjustments: The Pension Share would specify adjustments to the $1 per month per share payout based on the annuitants' age(s) at conversion, relative to the full benefit age. Also, adjustments are specified for a single-life annuity if selected instead of joint-and-survivor annuity.

Full Benefit Age: The Pension Share specifies the age (typically the Social Security Full Retirement Age) of each of two co-annuitants at which the payout will be $1 per month per share. Adjustments are relative to this age.

Annuity Contract: The NAO, if exercised, requires delivery of either a fixed-rate 100% joint-and-survivor immediate Annuity, or a fixed-rate single life annuity, depending on holder's choice, with payout adjusted based on annuitant(s)' age(s). The contract is funded by the lump sum amount, which is not adjusted.

Conversion Minimum: The Pension Share specifies the minimum number of shares (or total lump sum) that can be converted by a holder. Alternatively, the Pension Share may specify a defined per-annuity conversion fee that pays the underwriter for the expenses of issuing and servicing the contract.

NAO Premium: This is the price paid by the Pension Share issuer to the annuity option writer when a Pension Share is issued.

Failures: The Pension Share specifies what happens in the event of unwelcome circumstances (e.g., the NAO underwriter fails to meet certain covenants, such as credit rating, before or at maturity; or the Pension Share fund fails or is prematurely dissolved.

Dynamic Contract

The master NAO contract is preferably a dynamic or continuous contract, where the balance of the NAOs underwritten can change daily. The change in the balance occurs at a price set daily. Ideally, the price is set competitively.

Because Pension Shares are designed for and sold to retirement plans, the number of shares issued will usually be monotonically non-decreasing, i.e., on most days there will be net inflows (sales will be greater than redemptions). However, to be able package Pension Shares as a mutual fund under the 1940 Investment Company Act, the Pension Shares issuer must be able to meet net redemptions with cash. This means that the fund must keep sufficient liquid assets to meet all but the most extraordinary demands for redemption as explained below in the section entitled "How to Build Pension Shares" which contains further details on cash, bond, and FTV portfolio management.

Within some allowable margin of error, the fund must hold one NAO unit for each Pension Share or unit issued. This means that the issuer must be able to buy NAOs each business day, and potentially to sell back a portion of the NAOs written on some days, so the balance must be able to contract as well as expand.

This NAO premium or price is set competitively by normalized annuity option writers, and represents the present value of the risk that at the time of conversion the lump sum will be inadequate to fully fund, in actuarial terms, the adjusted annuity payout. Because the premium is set this way, it doesn't matter if the lump sum is set 'incorrectly'. The premium is the market price for the obligation to deliver annuities under the terms of the NAO contract for that maturity, so if the lump sum is set too high, the premium will be low, and vice versa. It can be thought of as a premium for an interest rate put, with a strike equal to the benchmark interest rate implied in the normalized annuity in a particular maturity. It also has an aspect of being a 'call on longevity' for the holder, with a strike equal to the implied median life expectancy in the normalized annuity.

The function of the NAO already exists in deferred annuity contracts, where the underwriter must agree to the terms of an annuity contract that will come into effect in the distant future, beyond the scope of interest rate forward contracts or other hedges. Unlike deferred annuity contracts, however, in Pension Shares this function is isolated from insurance contracts and is instead packaged as a security so that multiple firms can participate, and the function is given a market price. While multiple firms will compete on price, they also have the flexibility to exit their commitments by buying back the option contracts they have written.

Estimating the Fair Value of the NAO Premium

The following discussion presents an intuitive model. Disregarding longevity-expansion risk for the moment, and using the approximation $$a_{age}^{(12)} = f(age, \vec{q}, load, \vec{rates}, spread) \approx (1+load) \cdot a_{\overline{x}|}^{(12)} = (1+load) \cdot pv(i,x,1)$$

Where a is the immediate annuity premium, age is the annuitants' age at inception of the annuity contract, q is the mortality table, load is the expense of writing the contract, rates a vector representing the yield curve, and spread is the profit spread, i is the interest rate at the time the annuity commences payments, with duration equal to median life expectancy and x is the median (joint) life expectancy of annuitants (in months in the function notation), To simplify, we say in the following discussion that the immediate life annuity premium is approximately the present value of the payments over the median life expectancy. The option to purchase a normalized annuity defined with a benchmark interest rate (say, 3%) and life expectancy median assumption (say, 30 years) will be valueless at maturity if prevailing interest rates are greater than the benchmark (and competitive annuities are priced on similar life assumptions), because the holder could buy with the lump sum an annuity on the market that has a higher payout than the annuity delivered by the option. But if interest rates are lower than the benchmark at maturity, an annuity underwriter would be taking a loss to write a normalized annuity contract. Therefore, the NA option behaves like a European-style interest rate put with a strike equal to the benchmark interest rate and a term equal to the maturity. For this discussion we are dropping the load and the spread for simplification.

A theoretical minimum value of the normalized annuity option can be made from the present value of exercise-probability-weighted cost of funding the annuity when future interest rates are below the benchmark. Thus the current price of the option, P, may be calculated using the following equation:

$$P = (1+i)^{-T} \int_0^b \Pr(r)_T \cdot (pv(r, x, 1) - L) \frac{d}{dr},$$

where P is the current price of the option, i is the long-term discount rate when the NAO is priced, T is the time to maturity, b is the benchmark interest rate, Pr(r)T is the probability of rates equaling r at maturity, pv(r,x,1) is the present value of the unit payment at rate r, i.e., the market price of the annuity under prevailing interest rates, and L is the lump sum value, defined as approximately pv(b, x,1).

Inside the NAO

It may be worthwhile to further split the NAO into long-term options on interest rates and options on changes in the 'force of mortality' (or longevity expansion), that are separate from the actual annuity contracts. So at maturity, $$\ddot{a} = L + V(I) + V(M),$$

or, the annuity is purchased for the sum of the lump sum value L plus the expiration value of the interest rate put plus the expiration value of the longevity call M. Since L is predefined, at maturity V(I) is measurable, the annuity premium can be set competitively, and V(M) is an opinion, the actual operation would be to define $$V(M) = \ddot{a} - L - V(I).$$

A liquid market in this richer set of contracts would allow participating firms to efficiently hedge their portfolio of risks or earn additional income from their asset and liability portfolios.

Another variation is to define the NAO as a purely financial option. Instead of being a call on an annuity contract, the alternate NAO is a call on or other derivative of a Normalized Annuity Price Index, an index that tracks the current market price of the benchmark annuity. Thus, a holder can be sure that no matter what happens, the Pension Shares will have a value at maturity assured to be able to pay for an annuity in the marketplace. A service of effecting the purchase of annuities could be provided separately to shareholders for convenience, but the Pension Share issuer need never directly be involved with annuities, thus possibly relieving Pension Shares security issuers from insurance regulation and licensing. The logical counterparties in this alternate NAO would be insurance companies who face the identical financial risk in their ordinary annuity business and can now securitize it (in fact, in a more direct and elegant way than with full NAOs).

Figure 3:
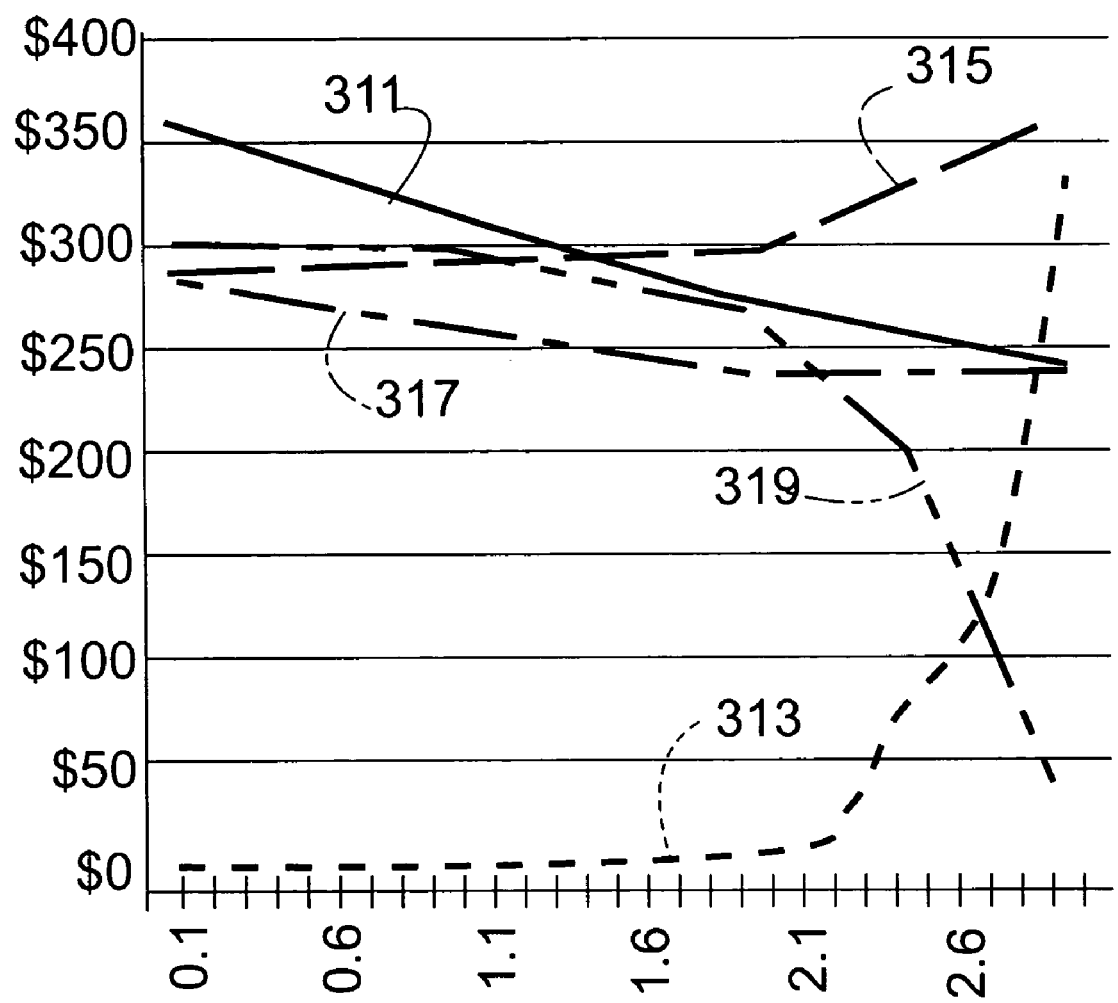
FIG. 3 is a chart graphically depicting factors that influence the pricing of a Normalized Annuity Option (NAO)

The curve 313 shown in FIG. 3 depicts the historical probability of the interest rate, using Moody's 10-year AA corporate interest rates as a proxy for the annuitization rate (the vertical axis is unitless for this quantity). In the last century, these rates were below 3% for only 10 years, roughly from 1940 to 1950.

The curve at 315 is a surmised value to show the reduction in adverse selection in terms of the median life expectancy of the annuitants, in months. The curve at 317 recalculates the price of the annuity based on the changed life expectancy assumption. The assertion is that with interest rates falling below the benchmark rate, the annuity option will look increasingly better than the lump sum.

The last factor needed to complete the estimation is the probability of exercise shown as curve 319. Since the normalized annuity is defined conservatively, it is not certain that just because interest rates are below the benchmark and the annuity is theoretically a better value than the lump sum, that holders will exercise the option. It may be estimated that exercise rates would rise from less than 10% at the benchmark interest rate, based on current rates of conversion, to perhaps 80% or 90% when interest rates approach zero. (The scale for this quantity is not shown on the graph.)

Amending the estimate, we get $$P = (1+i)^{-T} \int_0^\infty \Pr(r)_T \cdot (pv(r, x(r), 1) - L) \cdot \Pr(Exer(r)) \frac{d}{dr}$$

where we substitute life expectancy as a function of r to address reduced adversion, and add a term for the probability of exercise. Note the integration over all positive interest rates, instead of rates from zero to the benchmark rate. Actual behaviors of some shareholders are likely to be at variance from 'rational' decisions: some will choose to annuitize even if market rates at maturity are higher than the benchmark, and many will choose the lump sum even if market rates are below the benchmark. Convenience is a motivation in the first case, and flexibility is a motivation in the second.

Note that as the maturity nears, if rates approach or fall below the benchmark (i.e., the interest rate put will be in the money), the value of the options will increase.

Synthetic Deferred Annuity

The PensionShare™ concept is an example of a "synthetic deferred annuity", or SDA. A deferred annuity is an insurance contract in which a premium is paid some time in advance of the commencement of annuity payments. (In an immediate annuity, the payments begin immediately or at the end of the first regular payment interval.) Variations on a deferred annuity include:

flexible premiums (premiums may be paid at arbitrary times before annuitization, additional premiums increase the amount of the payout)

withdrawals (earlier premiums plus credited interest or investment returns may be withdrawn before maturity, or at maturity as an alternative to annuity payments)

investment returns based on units of investment in vehicles without a fixed return, including stock or bond funds, or investment indexes.

in the case of a fixed return, additional premiums or withdrawals may be accomplished at a value determined by prevailing interest rates (a "market value adjustment")

The insurance company that writes the contract guarantees the value of the investment (i.e., the premium plus credited interest or investment returns) and the annuity payments (single payer risk), although the investment may be kept segregated in a collective trust or separate account.

The Normalized Annuity Option allows the features of a deferred annuity to be provided in vehicles other than insurance policies or contracts, such as securities (including a mutual fund) or bank collective trust.

The SDA parallels the innovation of the synthetic guaranteed investment contract (synthetic GIC). A GIC originally was an insurance contract allowing deposits and withdrawals on an account with interest rates (crediting rates) guaranteed for some period. These products also allowed account to be carried at a book value (deposits plus credited interest) that could be larger than the fluctuating market value of the underlying fixed income investments. This book value guarantee allowed the underlying investment to be in longer-durated (and usually higher interest) instruments than a money market fund, which is the alternate to providing a book value guarantee. In a regular GIC (or BIC if from a bank), the underlying assets are the insurance company's general account. In the synthetic GIC, an institution provides a "book value wrap" on a portfolio that is not the general account.

When the SDA is based on a unit benefit (e.g., "one share has a target value of $x with an option to convert to an annuity paying $1/month for life adjusted on the beneficiary's particulars at time of conversion"), it is easy for an individual to do planning, as this answers a number of common questions, like "how much income will I have?" in a straightforward manner.

Defined Benefit Reporting

An important attribute of PensionShares and similar products (e.g., PensionAnnuity) is that the holder can know with reasonable certainty, if not an explicit guarantee, what future income and what future value at maturity can be obtained from the current holdings of the PensionShares financial instruments. In practice, there has been a shift from Defined Benefit retirement plans (pensions) to Defined Contribution plans, where the employee (plan participant) chooses the timing and amount of contributions to the plan, and usually also has a choice of investments for these contributions. But almost all such investments have variable returns, so the future income can be estimated only with stochastic techniques, and are subject to large variation in possible investment outcomes. While point estimates can be used, such as an expected average return, there is the possibility of shortfall which renders the estimated outcome a best guess.

A class of investment products, including PensionShares, based on the concept of synthetic deferred annuity (SDA), allow the holder to know the minimum value of the investment at the instrument's maturity, and to know the minimum income that the instrument can provide. Since knowing this target value and target or minimum income is important to the plan participant, it is a good idea to periodically report the value and income of the participant's holdings to the participant, or to make such values easily obtainable by phone through a voice response or operator assisted system, by computer via the web, etc. Especially valuable is to show the value and income in the context of any other holdings. Retirement plans routinely provide reports of current investment holdings to the participants, with the reports showing the individual participant's shares, current values, and other asset balances. Such reports can be extended to show the maturity value and income from that participant's holdings of SDA products.

Additional information is needed to provide the income figure because the incomes are usually subject to adjustment based on the age, number, etc., of the income beneficiaries. In many cases, these are available in the databases of the plan recordkeeper. If not, default assumptions can be used. Computer-based applications can also allow the user to self-report the relevant data, such as the particular product, maturity, holder's age, units or shares held, etc., and get the target value and income figures. Example:

Example Periodic Report

| XYZ Corp. 401(k) Plan Quarterly Statement for Joe Sixpack, age 47 | | | |
|---|---|---|---|
| Fund | shares | price | value |
| Equity Fund | 3,456.789 | 35.71 | $123,456 |
| GRInS ™ PensionShares 2023 Fund | 3,350.957 | 70.00 | $234,567 |

When you retire in 2023 at age 67, your PensionShares can be redeemed as a lump sum of about $200 per share ($670,000), or converted into a pension payout of $1 per month per share ($3,351/mo. or more). [Disclaimer . . .]

Additional features could include estimates based on participant-provided or default assumptions about future investment in the SDA products. Interactive computer software can let the user estimate the results of different levels of continued investment, the results of mixing SDA products with stocks, bonds, and other investments, or provide advice on same, or optimize savings rates and allocations including SDA products.

In the example, we use the guaranteed/minimum payout ($1/month, etc.) to show the retirement income. This is an improvement over typical insurance product "illustrations" which are based on assumptions like historical averages (although sometimes, very unlikely assumptions have been used). GRInS™ products like PensionShares™ do have an upside, depending on prevailing interest rates at the time of conversion to annuity payments. For example, using historical interest rates, the payouts would have averaged about $1.36/month per unit since 1919.

One method to help holders understand the upside is to show on the statement the payout that would be paid today, based on current rates, or the payouts currently going to real annuitants. E.g., to the statement could be added "You are guaranteed a minimum of $1/month/share in 2023 when the shares mature, but PensionShares maturing this year are paying $1.49 because of high current interest rates."

Stable Shareholder Service Fees

Investment companies base many of their fees on a percentage of the assets in an account or in a fund. This can be a problem in that many of their costs are fixed or otherwise do not correlate with changes in the market value of the assets managed or serviced. With targeted value investments such as PensionShares, it is possible to base the fees on a constant discount from the target value rather than a current market value, thus removing the variability of the fees paid. This makes for more stable conditions for business planning, and could allow the service providers to offer lower rates since much of the variability of fees has been removed.

Further, the fees can themselves be converted to assets (managed in the form of securities, or "securitized"). For example, in a mutual fund, the management, distribution, custodial, accounting, and other fees are taken from the assets. The fees are taken into account when the NAV (net asset value per share) is computed daily.

Variability of fees are particularly a problem with targeted value products such as PensionShares. How can you know the net asset value at maturity if you don't know what fees will be charged between now and maturity? Without discounted target value-based fees and without "assetized" fees, you have to make a conservative estimate of what the costs will be until maturity.

Discounted target fees can take the form of long-term contracts with managers and service providers that they will provide their services at predetermined rates, regardless of changes in NAV. (Fees will continue to be a function of the number of shares outstanding.) Securitization of fees can take place as follows: a contract or security issued such that one unit of the security matches one unit or share of the mutual fund, and represents the obligation of the service provider (issuer) to provide stated services until maturity of the fund. The security has a matching maturity or expiration. The provider has the right to set the price daily, and the fund has the right to buy or sell (extend or reduce) the number of units outstanding daily. Thus the fund can maintain (in fact it must maintain) an exact match between the number of service units held with the number of mutual fund shares that have been issued. Increases in service units requires the fund to pay the provider delta units * price; decreases in units, the provider pays the fund delta units * -price. The provider's price can be thought of as the net present value of all future services that are covered by the contract. A spread can be allowed to reward the provider for creating liquidity (a spread is a higher price for increasing units than for decreasing units).

Suppose the fund has a target NAV of $200 in 20 years. It simply invests in zero coupon bonds, now yielding 6% for maturity in years. A provider estimates that it will cost $1 per year to provide services, and the costs are subject to increases with inflation. It will agree to provide the services for a single payment now of $11.47 (the present value at 6% of $1/year for 20 years). The bonds need to meet a target of $200 are now worth $62.36 (present value of $200 discounted at 6% for 20 years). The fund must start by buying $62.36 of bonds for each fund share it issues, and buying one service unit at $11.47 for each share it issues. The fund has an initial NAV of $73.83. Remember, a prepaid expense is an asset.

This seems weird, what advantages does it have?

1. It has locked in expenses until maturity, removing an element of risk for the fund and its shareholders.

2. The service provider has locked in a stable source of revenue that doesn't vary with the market price of the assets in the fund.

3. If the cost of the services increases, the holders of issued fund shares still meet their target value (the services were locked in). In the standard pay as you go arrangement, an increase in fees after inception of the fund would mean that there would be a shortfall from the targeted net asset value at maturity.

4. Also, if the cost of the services increases, the provider increases the price of service units. This recovers his cost for additional units issued, or encourages the fund and its holders to redeem the units, thus giving the provider an exit (he can "buy back" his contract).

5. This allows a competitive market, just as a pay as you go arrangement. If the provider is raising his prices, a competitor can offer to perform the services at a lower price. The fund can redeem all the services units from the first provider, and buy an equal number from the new provider. The difference in price is a profit to the fund, for the benefit of the shareholders.

This securitization technique can be used in many ways, and is analogous to the securitization of the right to annuitize in the NAO, which would ordinarily be thought of as a continuing expense in a deferred annuity contract.

A Complete Defined Benefit Within Defined Contribution Plans

PensionShares, other SDA-based products, structured investment products, investment management processes with minimum returns, and investment return "wrappers" or guarantees provide the opportunity for DC plan providers to provide a pension for a participant in an easy, transparent way. In particular, any product or combination of products and processes that implement the GRInS Effect are useful in creating pension-like benefits with Defined Contribution plans. Additional services can be provided, however, to more completely solve the pension-replacement need. For example, procedures which can be embodied in software allow the participant to specify his desired retirement income, preferably in terms of a "replacement ratio", or percentage of compensation at the time of retirement (which is how most pensions are defined).

With inputs including replacement ratio, current retirement plan account balances, age, marital status, desired retirement age, and current yield and prices of Pension-Shares and other SDA-based products, one can compute the amount of retirement income that can be provided with certainty from current plan assets, and estimate the rate of continued savings required (under various assumptions about future compensation increases and future interest rate trends) to meet the target replacement ratio. The process can be performed periodically or on demand when needs or circumstances change.

This meets the well-documented need of many plan participants who, given the responsibility to plan and fund their retirement income on their own, feel completely insecure about the process. Also, since most current investment choices consist of variable-return assets such as stock funds or bond funds, the ability to plan with certainty reduces the anxiety that many plan participants are known to experience, especially in times of severe bear markets such as 2000-2002.

The GRInS Effect

The combination of a guaranteeable rate of return on investment accumulation coupled with an optional conversion to a guaranteeable payout is very powerful, particularly when the investment is liquid during the accumulation. Further, unitizing the relationship between the payout and the current value during accumulation has the benefits of making the liquidity practical (i.e., additions or withdrawals can be made in terms of units or shares) and in exposing the value of the investment in a new and useful way: the investment can be said to be denominated in terms of future income (the payout) as well as a value today. The unitized relationship facilitates reporting of the future payout to the investor, and enables the investor to make informed savings vs. consumption decisions without having to consult a financial planning calculator. The unitized relationship can be expressed such as "an income of $1 per month for life costs $60 today; $60 today is worth at least $1 per month for life of retirement income". (The example assumes a retirement age of about 65 in 20 years, with guaranteeable compound accumulation rates of about 6.2%.)

Financial instruments that benefit from this effect of relating future income to current values can include but is not limited to securities such as mutual funds, insurance products such as deferred annuities, and accounts such as a retirement account or bank account. Further, some of the benefits occur even without a financial instrument; later, we detail a Benchmark which estimates the relation for various horizons into the future, allowing very easy savings/consumption planning and enabling a new understanding of the nature and impact of investment risk.

Unitization and the expression of products as shares or units is not necessary for liquidity of financial products, but it is a good model for implementing products and to aid investor's understanding of the products and the liquidity feature.

The word "guaranteeable" is chosen to describe either:
financial results that can be called "guaranteed" by financial institutions allowed to do so (in the U.S., banks and insurance companies may use the term "guaranteed" with their products, while securities issuers generally are not allowed to do so), or
financial results in which the investor can have high confidence of achievement.

The first category has the practical risk that from time to time, institutions that have guaranteed results will fail and must default on their obligation. In these cases, some or all of the value of the guarantee or the guaranteed investment can be lost. The second category is subjective, but we mean that the probabilistic distribution of likely outcomes is at least asymmetrical, and, preferably, has a pronounced "cliff" in the distribution. For example, a combination of a long position in a security and a put contract on the same security can be said to have a distribution of ultimate values, none of which are less than the strike price of the put contract (net of expenses to exercise, etc.). However, in extreme situations, the put contract writer could fail and other obligated institutions could also fail, in which case the ultimate value is less than the strike. So rather than a cliff distribution with nothing to the left of the cliff, there is a distributional "rubble" at the foot of the cliff to represent the extreme outcomes.

Another way to quantify guarantee ability could be in the form "a less than x % chance of falling below result R, and the conditional tail expectation (the distribution-weighted average value of outcomes below R) is greater than y % of R.

There are examples of prior art that show some, but not all, of the features necessary to create the GRInS Effect.

A deferred fixed-rate annuity can include a guaranteed accumulation return and an option guaranteeing conversion to payout at predetermined minimum rates. Such products can include liquidity features such as the ability to add to or withdraw from the investment where the guaranteed accumulation is subject to a "market value adjustment" which reflects current interest rates at the time of the addition or withdrawal before maturity. To products like this we add one or more of:

- unitization of the payout relation, so that the investment in the product is denominated in terms of future income
- use of NAO contracts or securities to provide the payout conversion option, with the other benefits of financial transparency provided by NAOs
- use of separate accounts, trusts, etc., to segregate the accumulation investment from the general obligation (general account) of the issuing firm. (This allows a transparency to the underlying assets, and additions or withdrawals can take place at prices determined from the market price of the actual assets, i.e., a net asset value. It reduces risk to the issuer and to the investor since expansion or contraction of credit spreads may not be reflected in the rate used to price the market value adjustment.)

A deferred variable annuity can include a guaranteed accumulation return and an option guaranteeing conversion to payout at predetermined minimum rates (frequently referred to as Guaranteed Minimum Accumulation Benefit and Guaranteed Minimum Income Benefit, respectively). Such products can include liquidity features such as the ability to add to or withdraw from the investment. To products like this we add one or more of:

- unitization of the payout relation, so that the investment in the product is denominated in terms of future income
- use of NAO contracts or securities to provide the payout conversion option, with the other benefits of financial transparency provided by NAOs In variable annuity products, the investor is allowed to choose and from time to time to change his allocation across a number of investment options, some of which may be linked to variable returns (assets, indexes, or formulas with variable returns), and some of which are a fixed rate of return. Note that while mutual funds usually are required to directly own assets, other instruments may reflect direct ownership of underlying assets, ownership of derivative securities or contracts, or may reflect an obligation of the issuer to track the performance of specific assets or an index and so may be subject to the credit worthiness of the issuer in meeting these obligations. Typically, the guaranteed accumulation and guaranteed income conversion have a fixed price (in percent of assets charged per year) and a fixed rate (e.g., 3% per year). Since the investor can choose the allocation and timing, within limitations, the guarantor is facing risks for which he may not be adequately compensated (many untrained investors consistently underperform the markets in their decisions). Or conversely, the guarantees may be unnecessarily conservative or the fees too expensive in the presence of an efficient portfolio within the annuity.

A preferred implementation would allow adjustment of pricing or guarantees based on the measurable risk of the guaranteed portfolio. (The guaranteed portfolio can be the variable investments of an annuity, or any account where the holder desires limitation of risk.) A good addition would be to publish or provide the prices and/or guarantee rates given a hypothetical allocation so that the investor could make an informed decision.

Another preferred implementation would be to apply separately priced and separately set guarantees on each investment option available within the annuity. This model could also be implemented as a security, a PensionShares mutual fund based on a defined portfolio which can be a managed portfolio or an index. In any case, the guarantee can be to a maturity, or their can be a series of guarantee periods. In the presence of a payout guarantee, these products can be future income denominated.

There is a class of variable annuity products sometimes called Equity-Indexed Annuities, where the accumulation is defined by a formula based on the performance of some other investment instrument, usually an index such as the S&P 500. The formulas that define the return to the annuity holder typically could be a dynamic hedge, of which option pricing models are an example. This means that the annuity issuer can easily implement a hedge against the liability represented by the income due to the annuity holder. Note that the IPPS funds discussed elsewhere can be thought of as securitized versions of an equity-indexed annuity. Using the techniques of IPPS and COPP brings liquidity features to such equity-indexed annuity products. Further, the investment in the annuity can be contained in a separate account or trust to provide transparency and limit the risk of default by the issuer.

Retirement benefit statements can include forecasts of retirement income based on reasonable assumptions. When there is an external guarantor of results, such as a the sponsor of a defined benefit retirement plan, the user can look at such forecasts with whatever confidence is inspired by the credit worthiness of the sponsor. Investment returns may not even be an assumption in determining the outcomes. However, if there is no guarantor and the outcomes depend on the investment results of assets with variable returns, such as stocks, then a hypothetical illustration of outcomes becomes very sensitive to assumed returns, and the statement may have no way of adequately expressing the downside risks of variable returns. Even choosing an arbitrary 'worst case', such as the 5-th percentile return (based on expected mean and standard deviation of returns, or from a simulation) is not helpful, both because it is so far from the average and because within that distribution tail, there is still a huge range of outcomes, rare but potentially devastating to someone trying to plan for retirement. The Effect can be applied to retirement statements in several ways, including the use of PensionShares and similar products for the investments, the use of "wrappers" to provide guarantees of the investment portfolio so that the investment portfolio can be future income denominated and optionally, unitized, and use of the Benchmark, which allows the user to frame the impact of risk on his outcomes and quantify the risk in terms of future income.

When Annuitization is Mandatory

Most of the financial instruments described here include an option to convert the accumulated value to a stream of payments (an annuity). Variations on these instruments can be made where the annuitization is not an option. These could still allow discretion as to timing of the conversion which may occur at times other than a set maturity date, usually with a concomitant adjustment in the payout based on normal actuarial procedures and based on the actual accumulated value. These mandated conversion instruments have the advantage that the payout rates can be higher than with optional convertibility. This is due to the fact that any option has a cost, and removal of the option eliminates adverse selection. Such instruments necessarily have reduced liquidity, since being able to liquidate, redeem, or withdraw funds from the instrument before conversion in effect recreates the option to not annuitize. A useful feature with such instruments is to structure the annuity to have a guaranteed minimum total payout to address those purchasers who would have concerns about not living to receive at least that minimum payout which is one cause of adverse selection in annuity options.

The Need for a Retirement Funding Benchmark

In most investment management problems, we use benchmarks to look backwards, and compare some realized investment performance with the benchmark. Did active management of a portfolio add value? Was return commensurate with risk? With enough history, we gain confidence extrapolating into the future.

Before we describe a benchmark for retirement funding, is it really needed? We think so, for two important reasons:

1. Financial planners, investment managers, and plan providers can easily forget how 'at sea' the typical DC plan participant feels when tasked with being his own investment manager. Intensive education efforts over the past ten to twenty years has resulted in some good amateur managers, but also lots of anxiety. In our own research, participants volunteer that their hardest problem with their retirement savings career was getting started; once started, the anxiety comes from insecurity about their own financial competence and anxiety about what the outcome of their savings career would be.

Is there a default result that is good enough to act as the 'base case' to give participants a prudent path to follow and reasonable certainty about what to expect?

2. The tools we routinely use as investment and planning professionals don't encompass and reflect risk in the way it really affects retirement savers. For example, the mean-variance framework treats risk symmetrically: a result above expectation is "risk" just as is a negative result. These volatility (or more properly, uncertainty) measures of risk don't reflect the impact of below-expectation outcomes and don't give a good measure of that impact to the saver. For example, one household may face a retirement with many years left on the mortgage and children still in college; a retirement income shortfall could be devastating. Another household could have a clean balance sheet, no responsibilities, and a good relationship with nearby children; a shortfall could be a minor disappointment.

Is there a way to disclose the various risks of retirement in a way such that savers can make better choices, feel more confident, and understand the consequences of their decisions?

A retirement funding benchmark will both show savers an alternative with certain outcomes and place it in the context of their individual risk sensitivities.

The Goals for a Retirement Funding Benchmark

What is the benchmark that savers would intuitively seek? The Boomers have seen the employment environment shift from defined benefits (pensions), which were the gold standard for their parents, to defined contribution (e.g., 401(k), IRA), which give portability, control, and transparency, but at the sometimes large cost of individual responsibility for funding the account and managing the investments. The pension framework promised that "you come to work, and you'll get x % of your final pay, for life". What could be simpler? There were (and are) risks, particularly the single-company risk of funding the pension, and the inflexibility and lack of portability. Most employees do like the flexibility and choice found in defined contribution plans, but many will also voice a desire for a defined benefit, a way that the plan savings can have meaning in explicit terms of retirement income.

An ideal benchmark will reflect investment accumulations and lifetime payouts that are knowable, and that could be guaranteed. This encompasses the most important risks of retirement, though not all of them. In particular:

1. longevity (risk of outliving income)
2. investment (risk of a shortfall)
3. default risk (risk of partial or total impairment)
4. portability (strategy not dependent upon a single employer)
5. transparency (understandable by average participants, results realizable in practice)
6. inflation (we will discuss both inflation-indexed and nominal versions)

Since we are considering a pension in the context of defined contribution plans, or "DB in DC", we set aside two additional risks:

1. insufficient contribution
2. productivity (growth in compensation)

The risk of insufficient contribution can be met through mechanism or practice, and is discussed later. Future real compensation gains is a funding risk born by employers in pension plans, but has large variance across individuals, so this also is set aside (but is discussed below in " ").

The benchmark will allow us to estimate the certain price of retirement income for retirement savers. Estimates can be made for the past (e.g., what was the risk-free retirement funding performance for savers in 1980 expecting to retire in 2003), but more interestingly, we can make estimates for the future, with these benefits:

a saver can know the cost of funding a "risk free" retirement income a saver can know the amount of a risk free retirement income given an investment today a saver can measure the impact and probability of shortfalls that occur from higher return but higher risk strategies.

The GRInS Benchmark

To say the benchmark describes "risk free" retirement income implies an absolute guarantee. Investment practitioners stipulate that U.S. Treasury securities are risk free, at least because the Treasury can always print the money to repay its debts, hence, no danger of default. But some risk always exists, and for the purposes of the benchmark, we can employ a notion of a 'practically risk free' retirement income. The benchmark will describe target returns or incomes where there is only a small chance of a shortfall, and any such shortfall will most likely be small.

The Benchmark is simply a determination of the present cost of providing a unit of life income with quantifiable, limited risk of shortfall. A few items must be specified:
- the time at which payout begins (year of maturity),
- the number, age(s), and survivor payment rights of the beneficiaries.

We decompose the problem into an estimate of the cost of the payout (the retirement funding liability), and an estimate of the achievable returns to fund that liability. You will recognize the payout component is an immediate life annuity, and the funding component is a zero-coupon instrument so that the liability is exactly matched.

For expedience, we standardize the annuitization parameters to refer to a couple, both at the standard retirement age in the year of maturity, with 100% joint and survivor payout. Also, we assume that there will be no obligation for additional funding: each unit of life income is funded with a single investment. The benchmark value for a particular year is the present price of the unit of income, which can also be expressed as the expected yield to maturity. The unit we choose is $1/month, so that the result most closely matches the environment in which retirement savers do their planning (i.e., monthly budgets).

A recent estimate places the cost of providing at least $1/month income to standard retirees in the year 2023 at about $68. (This is detailed completely in Appendix 1. As discussed there, these particular numbers are in nominal terms, and not inflation adjusted.) In other words, a strategy exists such that a couple both age 47 with $136,000 in retirement savings could depend on those assets providing at least $2000/month. Further, they would have the option at retirement of taking a lump sum of almost $422,000 for alternative investment or spending.

Application of the GRInS Benchmark

A retirement saver now has a beacon shining through the fog of uncertainty. The Benchmark shows what can reasonably expected for retirement income without shortfall. As the "risk free" retirement result, it also works as a comparison for strategies with a higher risk of shortfall. A saver involved in a higher risk investment program, but who is especially sensitive to the risk of shortfall can quantify that risk and compare uncertain, risky outcomes with certain, relatively riskless outcomes.

Our research shows that while plan participants understand that a higher rate of investment return is better than a lower rate, they find the expression of investment results in dollars-per-month more appealing than in percent returns. Savers have the most anxiety about risk of shortfall, but few accessible tools for measuring and assessing the impact of those risks. Expression of outcomes in dollars-per-month rather than percent-returns is an important clarification.

In the context of Modigliani's Life Cycle Hypothesis, savers now have a way to make the marginal tradeoff between consumption today and consumption in retirement. For example, if the Benchmark for retirement income in 2023 stands at 60 (the price of $1/month for life in 2023 is now $60), then a family could decide if spending $6,000 for a vacation today is worth the certainty of $100/month income for all of retirement.

Rethinking Retirement Planning

The mean-variance framework allows us to estimate distribution of outcomes of an investment program, as do related simulation techniques. This is easy for the accumulation phase before retirement, but the retirement event requires an important decision for most savers regarding the continued management of the investments: should any or all of the accumulated savings be annuitized? After all, a life annuity is the way to guarantee lifetime income.

In general, if the assets are 25-30 or more times the income the assets should generate, the saver can reasonably expect the assets to last through retirement, and can contemplate continued direct investment. However, if the assets are below this level, the saver should consider annuitization to avoid longevity risk. Statistics show that the majority of retirement savers fall into the latter category.

We can model the results of annuitization by making estimates of longevity and interest rates, which are the two main variables in the payout rate for any type of life annuity. FIG. 4 shows the distribution of payouts estimated by applying historical interest rates with a minimum of 3%. The minimum payout is $1/month and the average is $1.36.

An investor placing an amount in stocks or a balanced stock and fixed income portfolio would expect a roughly log-normal distribution of probable accumulations. FIG. 5 shows a simulation of results for investing $1,000 for 20 years in a portfolio with a mean return of 8% and annual standard deviation of 12%, a plausible expectation for a 50/50 equity/fixed income portfolio. This "conservative" approach still has tremendous variation in terminal wealth.

Figure 6:
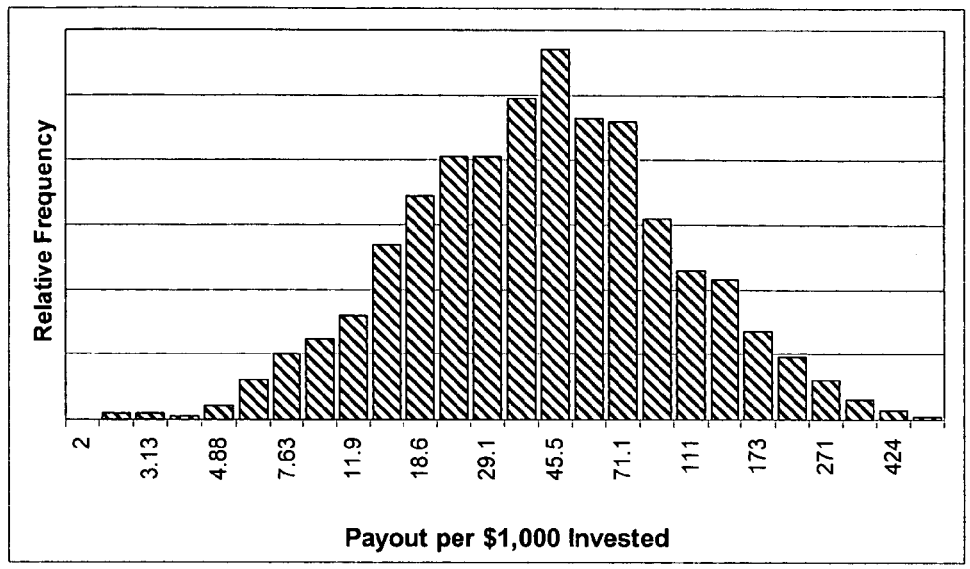
FIG. 6 shows the effect of combining the distributions of accumulations with payouts.

If we combine the distributions of accumulations with payouts, we still have a recognizably log-normal distribution of incomes as shown in FIG. 6.

The retirement saver in the typical DC plan without guaranteed outcome products faces tremendous uncertainty in retirement income expectations. If that saver has a high sensitivity to income shortfalls, he must plan for an income that is a fraction of the expected mean. How can the Benchmark help?

The Benchmark shows at any time what a saver could reasonably expect as a minimum retirement income result, and the saver can compare that guaranteeable minimum with his alternatives, and make a judgment for himself as to the impact of shortfalls below the Benchmark or risk free retirement income result.

Figure 7:
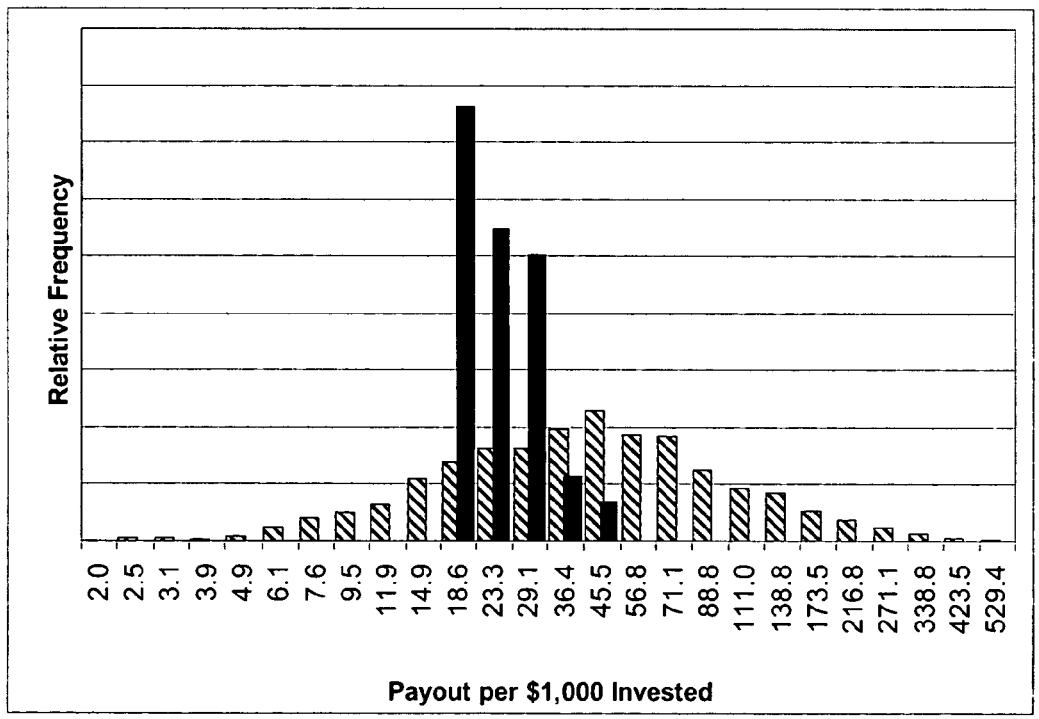
FIG. 7 shows current Benchmark results superimposed on the results of the balanced portfolio.

In FIG. 7, current Benchmark results are superimposed on the results of the balanced portfolio. While the mean expected income for the Benchmark is less than the balanced portfolio, note that the minimum return is quite distinct and obvious, very different from the left tail of the portfolio expectations. If the saver has high tolerance for shortfalls, he may wish to stay with the non-guaranteed results, gambling on the higher returns. But savers with low tolerance for shortfalls will want to focus on implementing the Benchmark strategy. Of course, the approaches are not mutually exclusive, and many savers can combine the strategies for a blended approach.

The advantage of the Benchmark is that the minimum or guaranteeable retirement income can be known with high certainty at any time, while the portfolio of "mean-variant assets" will always be a probability distribution with a wide range of results even for very conservative portfolios. This helps "value" the two strategies at any time. Investment science, such as it is currently, doesn't let us move the portfolio distribution curve up or down based on current market conditions, though most investment managers will always have an opinion about which side of the scale to rest their thumb. The Benchmark minimum is an observable fact at any time.

An Intuitive Risk Measure

The Benchmark yield to maturity is a close approximation of the "risk free" rate of return for retirement savings. In the mean-variance and CAPM frameworks, the risk free rate should match the period of analysis. If you consider time to retirement as the period, then the risk free rate is not the Treasury bill rate used in most such analyses, but a zero-coupon instrument or an immunized fixed income portfolio with duration matching the period.

A retirement saver will have two concerns:
1. What will be my retirement income?
2. If that income is risky (the actual amount uncertain), what is the probability and impact of shortfalls relative to expectations or needs?

In practice, volatility of investment returns is used as the metric for "risk tolerance", but this disconnects the measure from what the saver needs to know. Savers need to plan based on the probability of shortfall as well as the impact of shortfall. A saver who can expect to retire with a paid mortgage, income from other sources, and the opportunity and willingness to be dependent on family can rationally choose to maximize expected returns. But a saver who would retire with mortgage obligations and children still in college would be better served by minimizing downside. The latter needs to know the risk free retirement income, and needs to save and invest accordingly.

Figure 8:
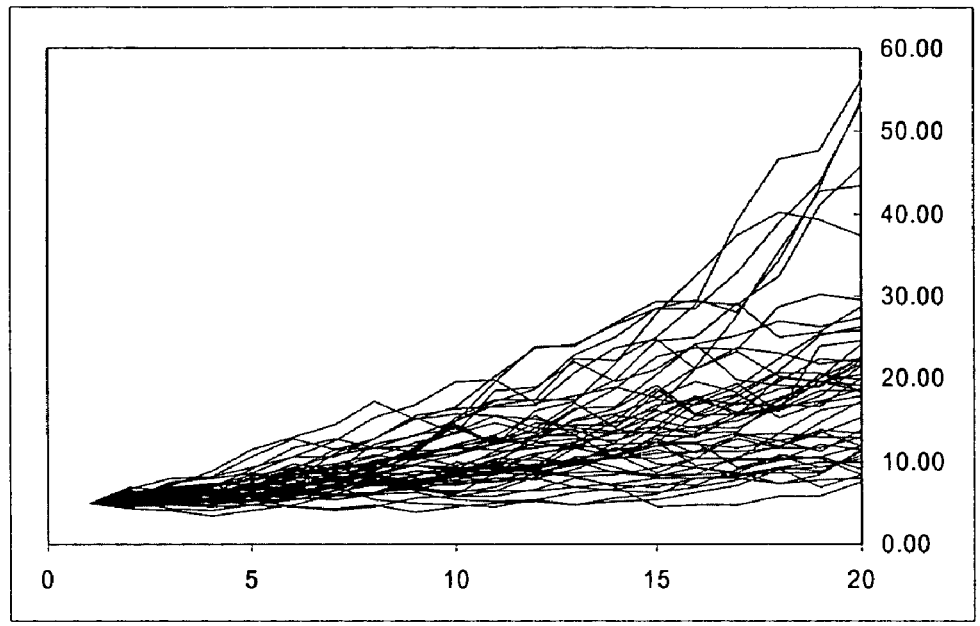
FIG. 8 shows a simulation of a number of possible outcomes from investing $1,000 for 20 years in a balanced, moderate risk portfolio.

FIG. 8 shows a simulation of a number of possible outcomes from investing $1,000 for 20 years in a balanced, moderate risk portfolio. The investment growth is shown year by year. We express the results not in dollars accumulated but in retirement income (dollars per month). Notice the wide range, with most results falling in the range of about $10 to $30/month for the $1,000 invested.

Figure 9:
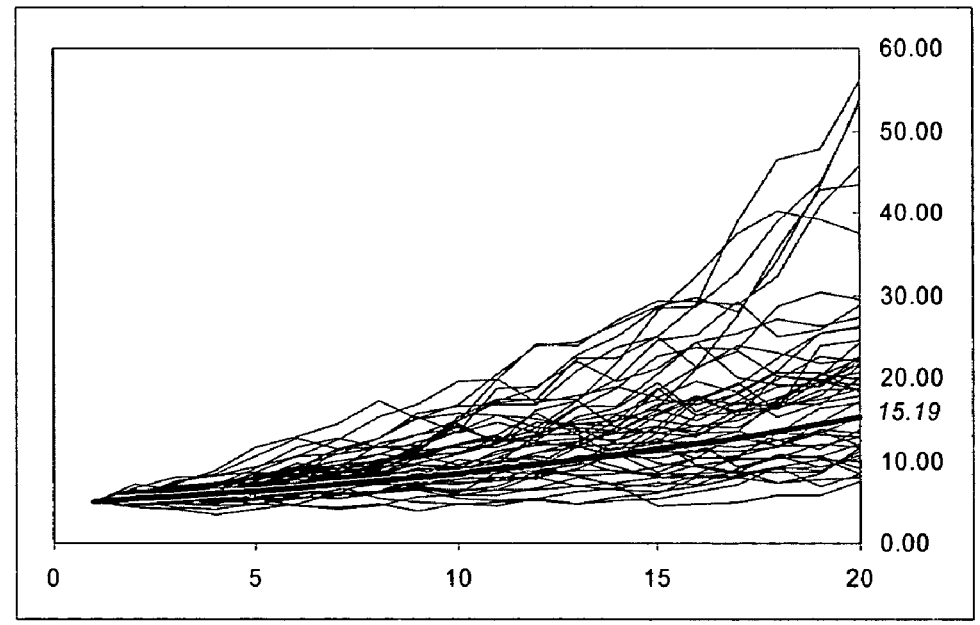
FIG. 9 shows the same results, but with the GRInS Benchmark superimposed.

FIG. 9 shows the same results, but with the GRInS Benchmark superimposed. While the risk portfolio might provide higher outcomes, it can just as well provide worse outcomes. If you need a certain income, and would be damaged by a shortfall, you can vastly increase your confidence in a retirement plan by investing like the Benchmark.

The advantage of the Benchmark is that the minimum or guaranteeable retirement income can be known with high certainty at any time, while the income resulting from a portfolio of "mean-variant assets" will always be a probability distribution with a wide range of results even for very conservative portfolios. The comparison helps "value" the two strategies at any time. Investment science, such as it is currently, doesn't let us move the portfolio's distribution curve up or down based on current market conditions, though most investment managers will always have an opinion about which side of the scale to rest their thumb. The Benchmark minimum is an observable fact at any time.

Investment Performance Analysis

While the GRInS Benchmark is important because it is forward-looking, historical Benchmark measures can be calculated as well. This allows analysis of risky, risk free, and combination strategies as experience by previous generations of retirement savers.

An illuminating case is that of a 45-year old in 1982 contemplating retirement in 2002. Of course, we know in retrospect that this was an ideal time period to make an investment in stocks, which from the beginning of 1982 to the end of 2001 returned about 15.24%. This was an outstanding result, since the history-based expectation going into 1982 was for a return of about 9.1%. (1926 to 1981 large company stocks total return, from Ibbotson SBBI). Or, think of the actual return as about a $90^{th}$ percentile experience.

Example Historical GRInS ™ Benchmarks

| Maturity | | Value Jan. 31, 1982 of $1/month beginning at maturity | Yield to Maturity |
|---|---|---|---|
| 20 years | 2002 | $ 12.88 | 15.0% |
| Data as of Jan. 31, 1982. | | | |

The 20-year GRInS Benchmark for January 1982 would have shown a yield to maturity of over 15% (a spot curve estimate: 20-year constant maturity T-bonds January 1982 14.57%, 3-month T-bill 12.4%, Aaa 10-year 15.18%.).

$]^1$. Astonishingly, the Benchmark showed savers a certain 15% return against an uncertain 9.1% expectation for stocks. 1982 was a dandy time to lock in high long-term yields, and the Benchmark would have shown savers the value of so doing.

The Benchmark in its yield to maturity form helps savers allocate between equities and fixed income, by exposing a dramatic measure of the price of risk. Sometimes, the risk free alternative will stand out; sometimes, the risky portfolio will look better. At all times, though, the saver can view the probability and impact of shortfalls.

A set of historical Benchmarks is available to go with the periodic release of forward-looking Benchmarks. See Appendix 2: Great GRInS Expectations for a brief historical analysis.

Earlier, we promised that the Benchmark would help savers understand both the probability and the impact of risky strategies on meeting a goal. From the dawn of Modern Portfolio Theory, there have been proposals to measure risk not just as the symmetric variance of returns, but the asymmetric risk, including negative semi-variance of returns, and the probability of falling below a particular goal. See Domar and Musgrave 1944; Roy 1952; Bawa 1975 and Fishburn 1977; and Sortino.

The GRInS Benchmark provides us with a risk-free-like return for use as a target return. Given mean-variance assumptions for a risky portfolio over a particular time horizon, the Benchmark return for the same horizon can be used to show both:
the probability that the risky portfolio falls below the Benchmark return, and
the expected return or expected value of returns that fall below the Benchmark.

Figure 10:
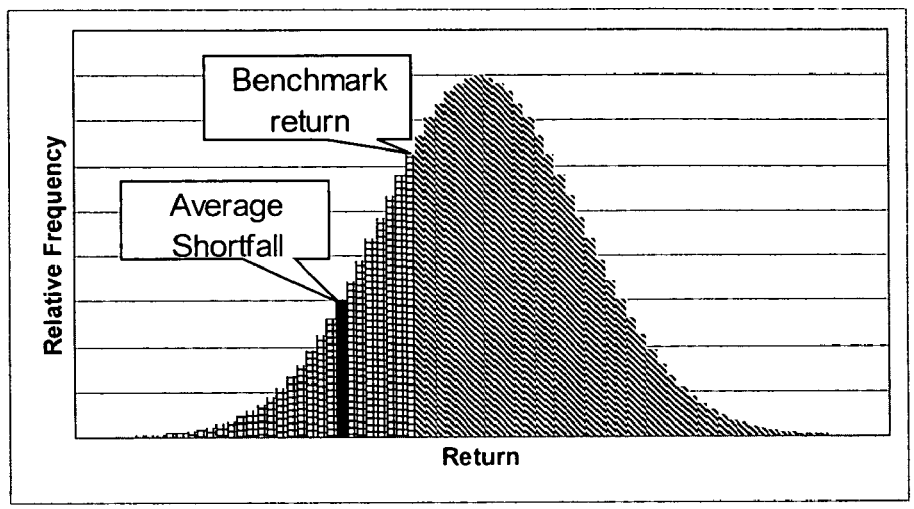
FIG. 10 illustrates the probability that the risky portfolio will fall below the Benchmark return, the expected value of returns that fall below the Benchmark, and the average amount of shortfall when it occurs.

By expressing the probability of shortfall as a percentile (i.e., the Benchmark represents the x-th percentile of expected returns of the risky portfolio), a conditional tail expectation can be calculated for that percentile in the context of the expected returns for the risk portfolio. Thus, you can know both your chance of a shortfall and an average amount of shortfall when it occurs as illustrated in FIG. 10.

In use, a saver could see that there is a 40% chance of shortfall, and the average shortfall, expressed in retirement income, is far below needs. That saver could shift assets to a vehicle or strategy that implements the methods the of the Benchmark. Another case could be that the saver sees a probability of shortfall of less than 10%, and determine that that probability is small enough to justify the higher expected returns and income from a riskier strategy.

The problem is that while the Benchmark outcome is knowable with high confidence, the risky returns are by definition not knowable. Further, in this application of estimating risk and degree of shortfall, the expected mean and variance of the risky returns are critically important. For the Benchmark, we publish estimates based on 'naïve' mean-variance expectations (i.e., historical returns), but also some conservative expectations (some would say pessimistic) that assume impacts of demographic trends, reversion to historical valuations, and reversion to long-term trend.

Investing in the Retirement Income Benchmark

Investors have long had "risk free" assets to implement their strategies, such as U.S. Treasury bills. Investment in a wide variety of benchmarks is also possible in the form of derivatives or portfolios that closely mimic a benchmark index. Retirement Engineering has formed its GRInS™ Program to develop a family of products that make the Retirement Income Benchmark an investment option. Through the innovation of the synthetic deferred annuity, products suitable for DC plans can be an option to many retirement savers. PensionShares™ (in development) realize the Benchmark as described in this paper, allowing savers to purchase retirement income in units of $1 per month, adjusted for the actual age, number, etc., of the beneficiaries when they convert the shares to an annuity.

PensionShares will be offered by a series of mutual funds. Each fund has a stated maturity and a target net asset value at that maturity. At maturity, the shareholder can redeem the net asset value in cash or convert to the annuity. As mutual funds, PensionShares are liquid (purchasable or redeemable daily), and the structure is transparent, meaning that shareholders can 'see' the assets of the fund that back up the shares' net asset value. Our research shows that ordinary plan participants easily understand the concept and like it.

Figure 11:
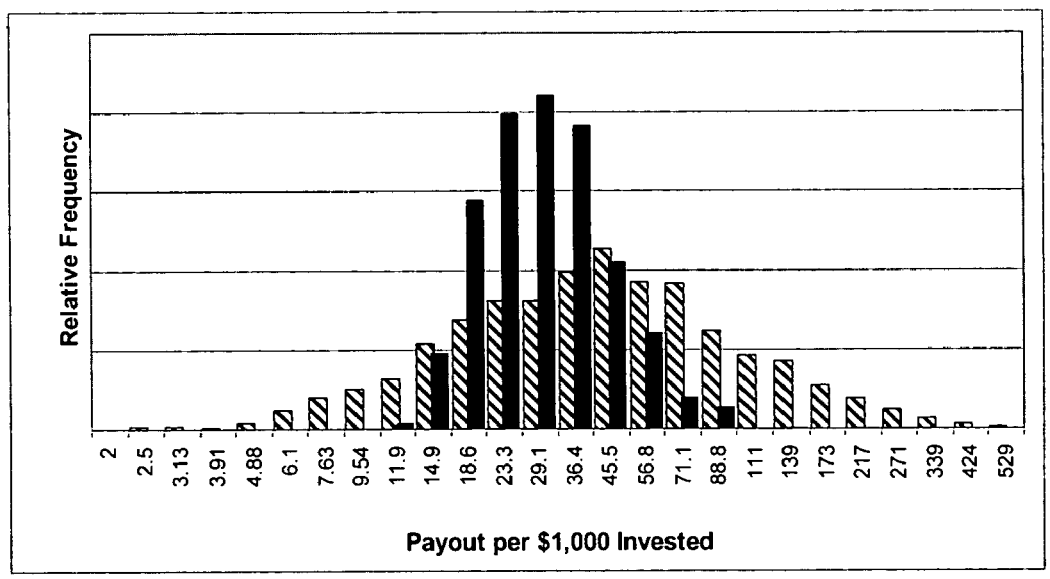
FIG. 11 compares the probable yield from PensionShares with the yield from fixed-income funds (coupon bonds)

FIG. 11 compares the income results from a portfolio that includes 50% PensionShares (green), versus the portfolio of mean-variant assets (red). Shortfalls below the benchmark return occur, but the impact of the shortfalls has been sharply limited.

Other PensionShares Advantages

The investment return of PensionShares (i.e., the yield to maturity) is mean-reverting: we can't tell you what the return will be over the next year, but we can say what it will be to maturity. This is a problem, shared with bonds, for single-period mean-variance optimizers.

Because they are denominated in a benefit (the minimum retirement income), savers are much less likely to fall into some of the traps identified by behavioral finance. Assets where you only know the current price lead investors to buy high and sell low; assets denominated in a future value will help investors recognize low prices, and so they are more likely to buy low and sell high. Alternative portfolios can be measured in estimates of the probability and magnitude of shortfalls against the Benchmark.

PensionShares are also a good alternative to fixed-income funds during accumulation. In periods of positive yield curves (most of the time), zero coupon instruments like PensionShares will have a higher yield to maturity than will coupon bonds.

Practicality—PensionShares in the Defined Contribution Context

What is the benchmark that savers would intuitively seek? The Boomers have seen the employment environment shift from defined benefits (pensions), which were the gold standard for their parents, to defined contribution (e.g., 401(k), IRA), which give portability, control, and transparency, but at the sometimes large cost of individual responsibility for funding the account and managing the investments. The pension framework promised that "you come to work, and you'll get x % of your final pay, for life". What could be simpler? There were (and are) risks, particularly the single-company risk of funding the pension, and the inflexibility and lack of portability. Most employees do like the flexibility and choice found in defined contribution plans, but many will also voice a desire for a defined benefit, a way that the plan savings can have meaning in explicit terms of retirement income An ideal benchmark will reflect investment accumulations and lifetime payouts that are knowable, and that could be guaranteed. This encompasses the most important risks of retirement, though not all of them. In particular:

1. longevity (risk of outliving income)
2. investment (risk of a shortfall)
3. default risk (risk of partial or total impairment)
4. portability (strategy not dependent upon a single employer)
5. transparency (understandable by average participants, results realizable in practice)
6. inflation (we will discuss both inflation-indexed and nominal versions)

Since we are considering a pension in the context of defined contribution plans, or "DB in DC", we set aside two additional risks:

7. insufficient contribution
8. productivity (growth in compensation)

The risk of insufficient contribution can be met through mechanism or practice, and is discussed later. Future real compensation gains is a funding risk born by employers in pension plans, but has large variance across individuals, so this also is set aside (but is discussed below in Appendix 1).

GRInS Benchmark: Summary

We have shown that there is a rate of investment return that can be known with some certainty. Expressed in terms of retirement income, we call this the GRInS Benchmark. This Benchmark is useful for retirement planning. It is also the basis for a class of products that will have strong appeal to retirement savers. Such products are a powerful implementation of Defined Benefit plan characteristics within the context of Defined Contribution plans.

The benchmark can be computed historically (i.e., what was the risk free return/income estimate for retiring in 2002 in the year 1982), but is most interesting because it is a forward looking benchmark, were most benchmarks are descriptions of the past.

The benchmark can be computed and published at regular, frequent intervals. Such publication would include a range of maturities such as 1 to 30 years, or every 5 years, etc.

Benchmark Appendix 1: Construction of the GRInS™ Benchmark

In "The nature of a retirement benchmark," we listed the six retirement funding risks that would be addressed. Two of the "risks" are simply features that we will require:

transparency—can the benchmark be understood? It's construction is described in this section.

portability—the benchmark will have no connection to any single employer.

Longevity

Longevity risk is addressed by immediate life annuities. For historical analysis, actual annuity prices can be used, but what will be the price of an annuity in twenty years? A simple life annuity price is a function primarily of two inputs: a mortality curve and an interest rate yield curve. The price must also include the overhead costs of administering the annuity, a profit for the underwriter, and an adjustment for adverse selection (assuming that the retirement saver will have an option to not annuitize his savings, but rather take a lump sum for alternate investment or spending). For purposes of estimating the annuity price, we can simplify it to a function of median life expectancy from the benchmark age and the interest rate for that duration. The benchmark age will be defined as the 'normal retirement age', which has been 65 in the U.S., but is increasing; we will use the Social Security full-benefit age for future years. Users of the benchmark will understand that the actual payout is adjusted for the age, number, sex, and perhaps other factors true of the annuity beneficiaries at the time the annuity begins.

How can the mortality curve be estimated in the future? What if there are significant advances in healthcare that dramatically alter life expectancies? We should remember that the fountain of youth scenario is offset by some other possibilities, including decreased life expectancy due to the side effects of obesity, and new infectious diseases rapidly spread through increased world travel. These are real concerns, but insurers are already taking and pricing that risk, which is all we need for the Benchmark.

How can we know what the interest rate will be in the future? The market handles this risk with interest rate forward contracts, but we don't know of a market that would encompass long-term rates in the far future, at least twenty years. Most naïve forecasts involve using a historical average, but that can mean that there is an equal chance of exceeding the target as falling below it. Again, insurers face the same problem, and meet it by guaranteeing a small rate, usually 3%. Historically, rates suitable for annuity pricing (e.g., Moody's Seasoned Aaa 10-year Corporate Bonds) show that over 90% of the time since 1919, these yields have exceeded 3%. In the months when the rates were below 3%, they were mostly above 2.75%. Should rates be 0%, the payout of an annuity would be perhaps 25% less than at a 3% rate, so it is not a total loss. The key for the Benchmark is that we know that underwriters are performing the function of guaranteeing today to issue annuities in the future at a guaranteed minimum interest rate assumption.

We know the price of a benchmark annuity and that sets the target amount that must be accumulated. By taking the estimated difference between expected retirement income needs and other sources of income, we know the desired level of annuity payments, and we know the price of annuity that will meet or exceed those payments.

Investment and Default

Investment risk is eliminated if we can be reasonably certain that an amount today will meet the target set by the annuity price. This is the well-understood problem of asset/liability matching, and can be addressed with standard strategies such as an immunized portfolio. Treasury securities could be used to provide presumptive default-free returns, but we see that in practice, corporate bonds can also be used, with the likelihood of capturing some portion of the credit spread, liquidity premium, etc., for the saver, in exchange for reserves or buffers against default risks, or explicit promises from independent financial guarantors.

Inflation

In the U.S., the Treasury has issued a limited set of inflation-indexed bonds, and these can be used for theoretical estimates of inflation risk free and default risk free rates of return. There are also examples of inflation-indexed annuities. However, until there is a full maturity spectrum of TIPS available and the roster of indexed annuities is more complete, we can't say that we can describe a practicable inflation risk free retirement funding benchmark in the U.S. Good signs are the advent of CPI (inflation) futures and a tiny but growing number private issuer inflation-indexed bonds.

During the accumulation phase, of course, the fixed income returns include a premium for the market's estimate of inflation. A practical, easy-to-build and price annuity would feature escalating payments. A 3% annual step in payout would mitigate the effects of inflation for annuitants who live beyond the median life expectancy for all but the worst historical periods of inflation.

Construction Summary

By estimating the future price of life income (or by collecting actual market prices for future annuity conversion guarantees from underwriters), and by measuring the market price for matching maturity debt, we know the price today for retirement income at a date in the future. For the use of retirement savers, the price is expressed in terms of $1/month income. For example:

The price today for a couple's (both age 67) retirement income of at least $1/month (100% joint and survivor) beginning in the year 2023 is about $68.15 today (Oct. 31, 2003). The actual payout could be higher, based on interest rates prevailing in 2023. This price includes an option to take a lump sum of $210.88 for spending or alternative investment. The payout would be subject to standard adjustments based on the actual ages of the couple, and would be higher for a single person.

Once the details are understood, this could be shortened to "the standard price of $1/month retirement income in 2023 is now about $68.15", or a yield to maturity in 2023 of 5.81%.

Specifically, this includes estimates of:
the cost of the annuity based on a median joint expected life of 25 years and 3% interest,
cost of the annuity future conversion guarantee based on the historical probability of rates being less than 3%,
a raw accumulation return of 6.95%, based on STRIPS yields plus the 20 year credit spread for A-rated corporate bonds,
less a reserve of 8% for cumulative defaults net of recovery (about twice the observed 20-year cumulative recovered defaults for A-rated corporates from 1920 to 2000),
less 0.70% annually for expenses.

The expenses are included to indicate a realizable rate of return.

Benchmark Appendix II: The Nature of Guarantees

Our name for certain accumulation and payout is Guaranteed Retirement Income Security, or GRInS™. In our research, we find that retirement plan participants accurately match this description to their needs for minimizing downside risk in retirement income and for understanding the outcome of the benchmark savings strategy.

But we erect a lightning rod for some with the use of the word "guarantee", so first an aside. What is guaranteed, by whom, and how good is it? Plenty of products legally called "Guaranteed" have failed, with partial or total loss for investors. To say that U.S. sovereign debt is absolutely guaranteed is a bit parochial, ignoring a broad view around the world and through history, where we see that any number of apparently unassailable states have failed in a variety of ways. Today, a twenty-five year-old must look at retirement income as an investment problem with at least a 60 year time horizon. Historically, Aaa-rated corporations have had a cumulative default rate of about 1% at 10 years, so a simple compounding of that probability puts a lower bound of about 6% chance of default in 60 years.

For the benchmark, we are going to use a practical notion of lower-case guarantees where there is a small probability of failure, and where failure is not a catastrophic. Again, we find that plan participants are actually more comfortable with the description of arguably limited downside than with an upper-case Guarantee in which lurks single-entity risk. So a 5% chance of an impairment that is plausibly limited to a few percent less than expectation is superior to an upper-case Guarantee where the same chance of impairment (default) means a 50 to 100% loss. From here, we will call the small-chance, low-loss guarantee a "target".

We refer to the "guaranteeable" (in lower-case) rate of return as the guaranteed return that accounts for a reasonable, historically informed experience of defaults. As a check, we also can estimate the net return after an estimation for the cost of insuring the return to the Aaa level.

Investment Evaluation Tools for Consumers

Three useful "calculators" have been developed to enable prospective GRInS purchasers to better evaluate investment choices. These tools may be implemented in Java and made available to consumers on the World Wide Web.

A Simple Spend-It-Or-Save-It calculator is illustrated in FIG. 12 which shows the screen display form presented to the consumer. This calculator is intended to help the consumer make savings decisions and understand the value of what they have already saved. The consumer enters her current age at 1201, a currently available sum in dollars that might be saved or spent at 1203, and the calculator then displays the equivalent monthly retirement income at 1205 which that sum would generate if invested in GRInS PensionShares™.

A Detailed GRInS Benchmark Retirement Income Calculator is illustrated by the Web forms shown in FIGS. 13 and 14. This calculator provides an interactive way for the consumer to see a more comprehensive estimate of the retirement income that would be produced by current savings.

To use the calculator, the consumer first enters background information in Step 1 as indicated at 1301, including the years in which she and her spouse were born. The calculator then inserts default values for their assumed year of retirement and their respective retirement ages, but these default values may be overridden if desired.

In Step 2, as illustrated at 1303, the consumer enters a current investment amount to see the Benchmark monthly income, or in the alternative, enters a desired monthly income to see the current investment that would be required to fund such an income.

In Step 3, shown in FIG. 14, the manner in which investment in a PensionShares fund can be used to lock in a desired income is described, and the calculator displays (1) the year in which the fund will mature, (2) the current estimated price per share, (3) the estimated yield the fund will realize to maturity, (4) the target lump sum value each share at maturity, and (5) the target minimum monthly pension payout per share, adjusted for the number of beneficiaries and their ages at maturity.

Figure 15:
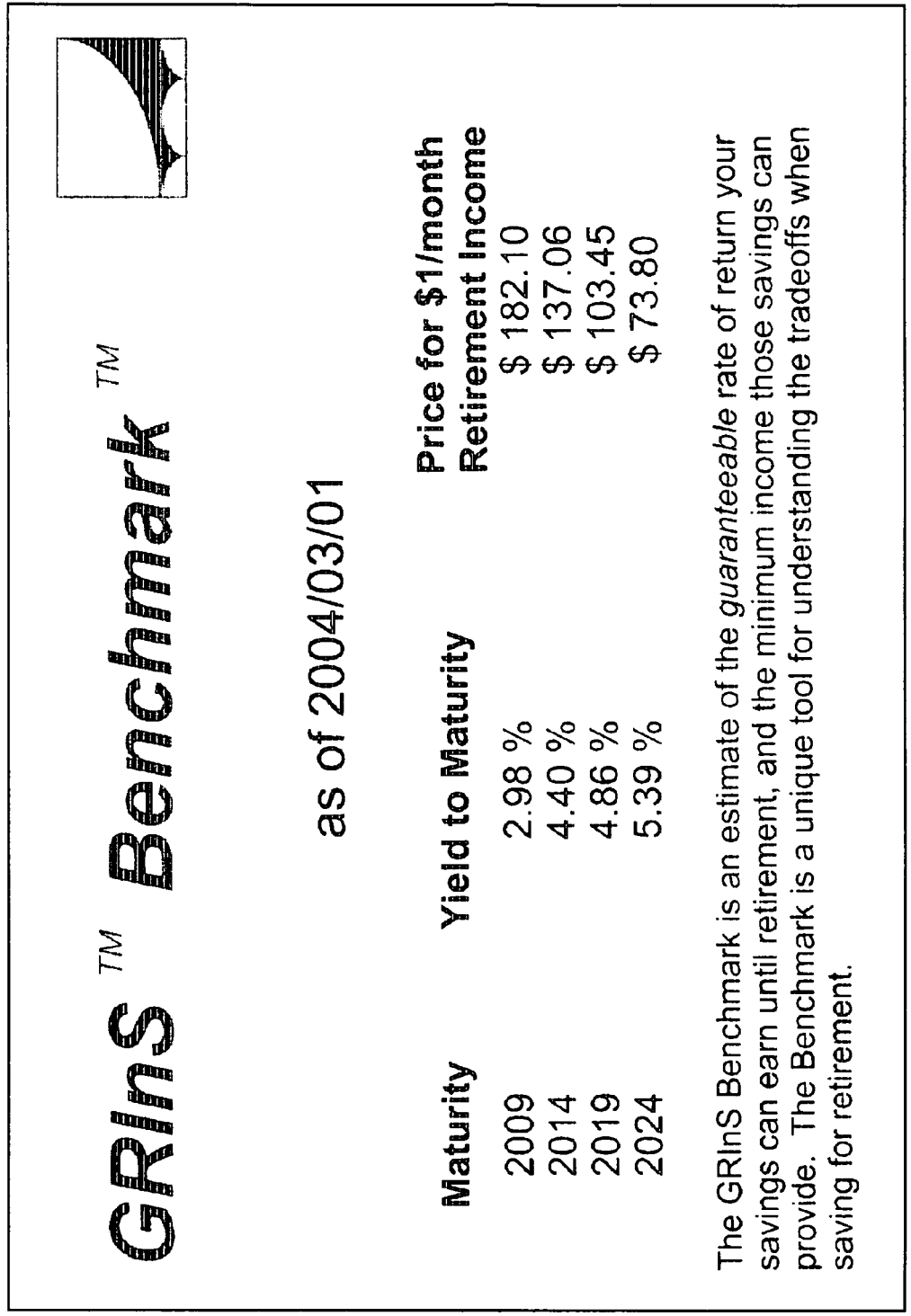
FIG. 15 shows a Web page which provides periodically (e.g., daily) updated information to consumers on the yield to maturity and current price of a $1/month pension payout.

FIG. 15 shows a Web page which provides periodically (e.g., daily) updated information to consumers on the yield to maturity and current price of a $1/month pension payout. This GRInS Benchmark estimate provides information regarding the "guaranteeable" rate of return on the customers savings, and the minimum income those savings can provide.

Building Pension Shares

The preferred method for creating the duration-specific portfolios needed to back Pension Shares utilizes, as its basic component, a Fixed Terminal Value (FTV) security with standardized features regarding maturity and credit worthiness. Financially, the FTV component of a Pension Share is a zero-coupon bond. FTVs can be written by underwriters such as insurance companies, or can be created as asset-backed securities (ABS). An exchange mechanism may be employed to aggregate raw FTV-like contracts or securities, reinsure the pools against default risk, and write standardized, insured FTVs for use by Pension Share issuers.

A Longitudinal CBO/CDO (Collateralized Bond/Debt Obligation) accomplishes the same function, except it does not present itself as an exchange for pooling and trading FTVs, but simply as an issuer of ABSs (Asset-backed Securities).

CDOs are structured investment vehicles that allow the "tranching" of risk attributable to a portfolio of fixed income securities. The capital structure of a CDO closely resembles that of a conventional finance company or a bank in that it typically consists of senior and subordinated debt, as well as equity. Substantially all of the debt issued by a CDO is typically rated by one or more rating agencies and is secured, in order of priority, by the underlying portfolio, which is frequently referred to as "collateral." A CDO manager is responsible for selecting and monitoring the credit quality of the portfolio during the life of a CDO. The term "longitudinal" refers to the fact that the tranches are segregated by maturity rather than by repayment seniority. In effect, pools of bonds or other debt obligations are 'stripped' in much the same fashion as Treasury STRIPS. Strictly speaking, this structure is more like Certificates of Accrual on Treasury Securities (CATS) and Treasury Investment Growth Receipts (TIGRs) since a party separate from the underlying issuer is doing the stripping.

The stripping function of the Longitudinal CDO can be accomplished by cooperating Pension Share issuers. While it is less elegant for the Pension Share issuers to be performing these functions (an issuer is expected to be a mutual fund, and the process seems excess for a mutual fund), it should avoid prohibited related party transactions.

For Pension Shares with maturities less than about 10 years, it is efficient to have managed-duration portfolios based on passively managed bond index funds, which themselves have very low costs. The following description is accordingly concerned primarily with portfolios for longer durations.

Issuer-Level Stripping

A Pension Share issuer can simulate the purchase of FTVs by managing a pool of non-callable fixed-income securities, insuring the pool against default risk, and selling any coupons or principal repayments that are not needed to back that issuer's particular Pension Share maturity. Multiple issuers may cooperate in the sense that, since they are each issuing a different maturity, each can use the parts of the portfolio that the more distant maturity issuers sell.

Example. Assume that Pension Shares are to be issued with annual maturities ranging from 2007 to 2022. All of the Pension Shares have a defined liquidation date, such as June 30 of the maturity year. For this example, insurance and other costs will be ignored, and the arithmetic is simplified by assuming a flat yield curve of 5% for all terms 0 to 20 years. On the day of this example, each Pension Share issuer receives an order to purchase $1,000,000 of Pension Shares. The 2022 fund buys $2,693,620 face amount of non-callable bonds with a 5% coupon due Jun. 30, 2022. How can the fund buy bonds worth 2.7 times the amount of money it has to invest? It will sell (strip) the coupons for all years prior to the maturity year. By selling the coupons in annual tranches, it is issuing FTVs. However, to fit in current regulatory frameworks, which don't allow a fund to issue senior securities, it may be necessary to form this as a forward contract.

The 2022 fund will sell the coupons due in 2021 for $51,220 (the present value of the $129,429 in coupons discounted at 5%). The fund sells the 2020 coupons for $53,780, and so on down to the first coupons payable. The total receipts for the stripped coupons are $1,693,620, which happens to equal $2,693,620 minus $1,000,000. So the fund has a net investment equal to the inflow (the net share purchases for the day), and at maturity the fund has $2,693,620 in principal, the face amount of the bonds, to pay the lump sum amount for that day's newly issued Pension Shares (a 5% return compounded).

The 2021 fund is a buyer of the 2021 coupons, but still has $948,780 to invest. It buys $2,564,190 face amount of bonds due in 2021, and repeats the same stripping process as the 2022 fund. And so on down to the nearest maturing fund.

Discussion

For marketing reasons, it is anticipated that Pension Shares will not be initially issued with maturities less than about five years or more than twenty years, but that new Pension Shares with a new twenty year maturity will be issued each year. Of course, five years after the first issuance, there will always be a maturity in each of the next twenty years. Until that time when there are funds maturing within a year, however, the near coupons will need to be sold on the open market to third-party buyers. In practice, all transfers of coupons or FTV-equivalents need to be through the market, or at least exposed to the market, so that the prices are correct and to avoid regulations against related-party transactions. Also, it may sometimes be the case that the net demand at a distant maturity is so much in excess of near maturity demand that not all coupons can be absorbed by the near funds, in which case the excess must be sold to third parties.

Portfolio Construction

As soon as redeemable open-ended FTV contracts are available, there will be no need to manage a portfolio at the fund level, other than to see that all assets are always invested. Until then, each maturity will need its assets to be managed for maximum returns while minimizing disruption due to any days of net redemptions. As discussed above, a three- or even four-tiered portfolio may be needed consisting of cash, a Zeroes Portfolio of treasury and agency zero-coupon STRIPS, a Core Portfolio of insured corporates and forward contracts and liquid FTVs, and illiquid no-put FTVs and Bullet GICs (Guaranteed Investment Certificates).

It is important to accurately estimate the "maximum short-term cumulative net redemption", or, from some high watermark of assets, what level of net redemptions can be tolerated before assets must be sold at a 'distressed price' (i.e., at the bid price of a wide spread). If there is a redemption charge of, say, 1% paid into the portfolio, then this is much less critical, as over time the redemption charge will cover the spreads. It will also be important to have prior notice of mass redemptions, such as a large retirement plan being transferred to a provider without Pension Share products.

Redemption Costs. The redemption fee can be smaller than 1%. To estimate the minimum fair redemption fee, use a relation such as:

$$K = \frac{\sum_n r_d \cdot s(r_d)}{\sum_n R_d}$$

where K is the redemption cost estimated by looking ahead (or back) n days and taking the net redemption dollars r times the average asset-price spread encountered to meet that level of redemptions s(r) as a ratio to all redemption dollars R that day. The net redemption is r=max(R−P,0), where P is purchase dollars for the given day. Note that the risk is not just single-day redemptions but series of days with accumulating redemptions. For this reason, an estimate of multiple day drawdown would be most useful.

The size of the fund has an impact on the allocation, so that a fund with only $1M in assets would be required to hold all cash and STRIPS. It will be important to grow the assets quickly to minimize the percentage of inefficient, low yield assets.

Since the cash portfolio is intended only to meet occasional net redemptions and the cash that cannot be efficiently deployed in STRIPS or the Core Portfolio, there is no need for elaborate management of Bills, repos, etc. Institutional money market or cash management funds should be acceptable.

The Zeroes portfolio needs to be only large enough to meet the maximum short-term cumulative net redemption discussed above, i.e., it acts as a buffer to protect the Core portfolio from inconvenient or untimely redemptions.

The Core portfolio will preferably be the largest component and will consist of diverse investment grade corporate bonds and duration-matched forward contracts. The bonds are stripped by selling the coupons as forward contracts. The forward contracts for a particular fund are bought from longer maturity Pension Share funds or third parties willing to meet the credit requirements and contract terms, and sold to third parties or Pension Share funds with nearer maturities. The corporate bonds (and the bonds' coupons) are insured against default by financial guarantors.

The corporate bonds will be limited to 5% of the fund's total portfolio in any one bond issuer. The guarantor may have additional requirements and limitations.

The forward contracts are simply a payment now in exchange for a single repayment at a specific date in the future. The contract is backed only by the insured Core portfolio, and not by the full faith and credit of the fund, so that the contract defaults if some securities in the Core portfolio default and the guarantor also defaults. A forward contract backed by the coupons of diverse issuers may also be considered diverse by regulators.

Finally, the fund can maintain a limited illiquid portfolio, in order to benefit from higher yields on illiquid contracts for long-term debt.

Net Asset Value Calculation and Policies

Shares of a Pension Share fund are priced the same way as any other mutual fund, collective trust, or separate account. The net assets of the fund are divided by the number of shares issued. As discussed below, it will be important for Pension Share funds to have redemption fees applied to shares redeemed before maturity. Insofar as some of the assets of a Pension Share fund will not be actively traded, there will have to be a policy for valuing these assets. The discussion which follows therefore also explores the interaction of the Net Asset Value (NAV) with spreads in the funds' assets' prices.

Impact of NAV Policy, and Sales and Redemptions on Shareholders

The details of NAV calculation wouldn't matter except that in practice, the funds will have to publish a NAV before knowing how many new shares will be sold or how many old shares will be redeemed for cash. To be fair to continuing shareholders of any mutual fund, marginal fund share sales would occur at the marginal asset asked price, and marginal fund share redemptions would occur at the marginal asset bid price. Otherwise, continuing shareholders are slightly diluted by issuing shares at less than the cost of new assets, or continuing shareholders are slightly impaired by redeeming shares for more than the price at which assets can be liquidated.

Most funds minimize this 'spread drag' on long-term results by maintaining cash in the portfolio. Impairment in assets due to redemptions in excess of cash can sometimes be minimized by temporary borrowing, delaying redemptions, or redeeming in kind, but is otherwise tolerated as slightly reduced long-term performance. For Pension Share funds, however, this becomes an issue because the objective is to meet a specific NAV target at maturity, and any unplanned costs along the way make that more difficult. Also, it is generally true that cash and highly liquid, low-spread assets have lower long-term returns than less-liquid, high-spread assets, so having to hold cash as insurance against redemptions also lowers overall returns for the shareholders. The way funds usually simulate separate bid and offer prices is with redemption fees that are paid into the portfolio. Funds can have separate bid and offer prices that is typically an expression of front-end loads.

Policy for Valuing Assets with Large Spreads

Through most of the existence of a Pension Share fund, it will experience net purchases on a daily basis. For this reason, the published NAV should be based on the asked price of fund assets, rather than a midpoint or the bid price. This is because the marginal fund share purchases will tend to require the fund to purchase assets at the asked price. Experience may show that skillful managers can able to improve on this to the benefit of the fund shareholders.

In the event of net redemptions, the fund's intent to meet a target NAV at maturity can be impaired if illiquid assets have to be sold at the bid price, but the fund shares are redeemed at an NAV based on the asked price of the assets. This impairs the value of the shares of the remaining shareholders. This problem is addressed in two ways:
  1. The portfolios will contain a portion of highly liquid and efficiently traded securities to meet the majority of days with net redemptions; and
  2. The fund can impose a redemption fee that is paid into the portfolio.

The redemption fee probably does not have to be large to protect the fund and the remaining shareholders. The fee can be estimated based on the probability of days of net redemption, and the mix of assets in the fund, as described above. It is estimated that the fee need only to be a fraction of 1%, but may be set to 1% to emphasize the long-term character of Pension Share investments.

However, as maturity nears and many shareholders have to finalize their retirement plans, the probability of net daily redemptions increases. Holders retiring earlier than anticipated may liquidate their holdings in part and holders who recognize they will retire later will exchange to later maturing funds. For any particular fund, the second motivation is likely to balance out (exchanges out to later funds will be balanced by exchanges in from earlier maturities). It is expected that net redemptions will be significant only in the last few years. Fortunately, this corresponds with a narrowing of spreads as the maturity of the assets approaches zero.

The redemption fee may be made inapplicable to exchanges between Pension Share funds, as exchanging is likely to be an important feature for shareholders, and because exchanges will tend to balance out. However, some limit on the number of exchanges will be needed; otherwise, someone intent on using Pension Shares for interest rate speculations could switch between the nearest maturity as a cash equivalent and the farthest maturity as a way to short rates.

Non-Market Assets

The Normalized Annuity Options (NAOs) that allow the Pension Share shareholders to choose to take annuity payments instead of the lump sum at liquidation may not have a public market. The standard contract between Pension Share funds and the NAO underwriters that creates NAOs will need to specify terms for premature redemption or a put feature. Ideally, the underwriters will create a market by publishing competitive bids and offers for new NAO units. Each business day, the inside spread set by the underwriters is used to value the NAO units held by the funds.

The spread of NAO prices will also need to be reflected in the funds' redemption fees. The extreme case is that NAO spreads are large (10% or more?) and NAO values become large compared to the NAV. For example, if long-term interest rates drop to 0%, the NAO will be worth about $50 compared to the lump sum value of $200-250, so the NAO spread itself would be around 1% of NAV. Note that in the U.S., historically, the lowest long-term rates for valuing NAOs has been about 2.5%.

The principal terms of a specific illustrative Pension Share offering maturing in the year 2022 is set forth below in an illustrative prospectus. In the example, specific variables which are calculated at the time of issue are shown in brackets.

EXAMPLE PENSIONSHARES™ 2022 FUND PROSPECTUS

Investment Objective

The Fund seeks to preserve principal and achieve a target payout to shareholders upon the Fund's planned liquidation in 2022.

Principal Investment Strategies

The Fund invests primarily in a combination of—

Zero coupon bonds and other instruments known generally as "STRIPS"—investments based on the separately traded interest and principal components of securities issued by the U.S. Treasury or U.S. Government agencies and guaranteed by the full faith and credit of the U.S. Government.

Investment grade fixed-income securities such as long-term corporate bonds and other corporate fixed-income obligations. Investment grade bonds are those rated Baa3 or better by Moody's Investors Service, Inc., BBB- by Standard & Poor's ("S&P"), or the equivalent by another independent rating agency.

Forward contracts and other derivatives instruments that separate the interest and principal components of investment grade fixed-income securities. The Fund will not use derivatives as speculative or leveraged investments.

Additionally, the Fund will purchase sufficient options for future delivery of annuity life insurance policies to provide the Shareholder Annuity Option described below.

The Fund's investment adviser manages the Fund's portfolio to achieve a minimum target payout of $197 per share at the time of the Fund's planned liquidation on Jun. 30, 2022, which is referred to in this prospectus as the "Fund Maturity Date". The target payout, while not guaranteed by the Fund, is supported by a conservative investment philosophy of investing substantially all of the Fund's portfolio in a combination of U.S. Government and related securities, and investment grade fixed-income securities and related instruments. The ability of the Fund to achieve the target payout is further enhanced by the Fund's purchase of insurance supporting the credit quality of certain of the non-U.S. Government fixed-income securities in the Fund's portfolio. This insurance essentially insulates these investments from the types of credit risks described below.

The Fund's investments are focused on achieving the minimum target payout on the Fund Maturity Date, and are managed without regard to current income.

Shareholder Annuity Option. For each Fund share you own on the Fund Maturity Date, you will have the choice of receiving—

A lump sum cash payment equal to the actual net asset value per share achieved by the Fund, which is expected to be at least equal to the minimum target payout.

An option and sufficient cash to purchase an annuity insurance contract paying $1.00 per month for life, in effect providing you with a lifetime pension equal to $1.00 per month for each share you own. The option will automatically be exercised immediately following its distribution to you by the insurance company providing the annuity contract. The value of the annuity payments may be reduced if the Fund does not achieve its target payout. Additionally, the value of the actual annuity payments will be set at the time the contract is issued, and may be adjusted at that time based on your age and the number of beneficiaries as described in the "Annuity Payment Adjustments" section below.

A combination of a cash payment for some shares and an option to purchase a life annuity contract for your other shares.

Annuity Payment Adjustments

The option to purchase a life annuity contract paying $1.00 per month for each share you own is based on two assumptions in addition to your Fund achieving its minimum target payout: (1) that there are two spousal annuitants (or beneficiaries), and (2) that both annuitants are [67] years old on the Fund Maturity Date. Your actual contract payments will be adjusted based on your situation at the time the contract is issued. For example, if you are single with no spousal beneficiary, the contract payments will be increased. Likewise, if you older than [67] the payments will be increased, but if you are younger than [67] the payments will be decreased. The Funds are designed with the expectation that most investors will choose a Fund with a Fund Maturity Date closest to the time when they will actually turn 67 to minimize the adjustments to the annuity contract payments from $1.00 per month per share. The table below shows in more detail how any adjustments will be made.

Table Omitted

Principal Risks

An investment in the Fund could lose money, and is not insured or guaranteed by the Federal Deposit Insurance Corporation or any other government agency. The Fund's performance could be hurt by—

Interest rate risk, which is the chance that bond prices overall will decline over short or even long periods because of rising interest rates. This risk is increased to the extent the Fund invests mainly in long-term bonds, which have prices that are much more sensitive to interest rate changes than are the prices of shorter-term bonds. This risk is greatest for shareholders who do not hold their shares until the Fund Maturity Date. The Fund's investment adviser uses "bond immunization" techniques to protect the ultimate value of the portfolio at the Fund Maturity Date, but bond immunization does nothing to minimize share price volatility before that date.

Credit risk, which is the chance that a bond issuer will fail to pay interest and principal in a timely manner. Credit risk should be low for the Fund because it invests mainly in U.S. Government securities and corporate bonds that are considered investment grade. The Fund may at times purchase insurance supporting the credit quality of certain of the non-U.S. Government fixed-income securities in the Fund's portfolio. This insurance essentially insulates these investments from credit risk.

Liquidity risk, which is the risk that certain securities held by the Fund may be difficult to sell for a variety of reasons, such as the lack of an active trading market.

Is the Fund a Suitable Investment for Me?

The Fund may be a suitable investment for you if you—

Are investing through an IRA or other tax-deferred retirement plan (such as a 401(k) plan).

Have long-term financial goals for your investment, such as retirement, that correspond with the Fund Maturity Date.

Wish to combine the benefits of a "defined contribution" (your investment) with a "defined benefit" (the minimum target payout or Shareholder Annuity Option).

The Fund probably is not a suitable investment for you if you—

Are seeking current income.

Are a short-term investor.

Fees and Expenses

The following table describes the fees and expenses you may pay if you buy and hold shares of the Fund. The expenses shown under Annual Fund Operating Expenses are based on estimates for the current fiscal year ending Dec. 31, 2002.

| SHAREHOLDER FEES (fees paid directly from your investment) | |
| --- | --- |
| Sales Charge (Load) Imposed on Purchases: | None |
| Sales Charge (Load) Imposed on Reinvested Dividends: | None |
| Redemption Fee: | [1] % (see Note 1) |
| Exchange Fee: | None |
| ANNUAL FUND OPERATING EXPENSES (expenses deducted from the Fund's assets) | |
| Management Expenses: | [ ] % |
| 12b-1 Distribution Fee: | None |
| Other Expenses: | [ ]% |
| TOTAL ANNUAL FUND OPERATING EXPENSES: | [ ] % |

Note 1:
A redemption fee is assessed by the Fund as follows: 1% on all redemptions prior to [June 30, 20__], 0.75% on all redemptions prior to [June 30, 20__], and 0.5% thereafter on all redemptions prior to Jun. 30, 2022. The redemption fee does not include a one time service fee of up to [$500] that may be assessed by the insurance provider for each annuity life insurance contract you purchase following liquidation of the Fund.

The following examples are intended to help you compare the cost of investing in the Fund's shares with the cost of investing in other mutual funds. They illustrate the hypothetical expenses that you would incur over various periods if you invest $10,000 in the Fund's shares and then redeem you shares at the end of those period. These examples assume that the Fund provides a return of 5% a year and that operating expenses remain the same. Although your actual costs may be higher or lower, based on these assumptions your costs would be:

| 1 YEAR | 3 YEARS | 5 YEARS | 10 YEARS |
| --- | --- | --- | --- |
| $[ ] | $[ ] | $[ ] | $[ ] |
| $[ ] | $[ ] | $[ ] | $[ ] |

If you did not redeem your shares, your costs would be:

| 1 YEAR | 3 YEARS | 5 YEARS | 10 YEARS |
| --- | --- | --- | --- |
| $[ ] | $[ ] | $[ ] | $[ ] |
| $[ ] | $[ ] | $[ ] | $[ ] |

More Information About the Funds

Below you will find more detail about the principal investment strategies and policies that the Funds use in pursuit of their investment objectives. The Funds' Board of Trustees, which oversees the Funds' investment adviser, may change investment strategies or policies without a shareholder vote, unless those strategies or policies are designated as fundamental. Note that each Fund's investment objective is not fundamental and may be changed without a shareholder vote.

The balance of the prospectus includes information on other important features of the Funds.

Investment Strategies and Portfolio Management

The investment adviser manages each Fund's portfolio to protect principal while achieving the target payout for that Fund at its planned liquidation date (June 30 of the year for which the Fund is named), as described above in the Fund's summary under "Principal Investment Strategies". Under normal market conditions, substantially all of a Fund's portfolio will be invested in a combination of cash, U.S. Government securities, investment grade corporate bonds, and related derivative securities (generally forward contracts for bond coupon payments). These investments are meant to financially replicate a "zero coupon" security sufficient in value to at least meet the target payout.

The expected likelihood of a Fund achieving its target payout is based on the conservative use of investments described above, and is further enhanced by the Fund's purchase of insurance supporting the credit quality of certain of the non-U.S. Government fixed-income securities in the Fund's portfolio. This insurance essentially insulates these investments from the types of credit risks described below.

Each Fund will purchase sufficient options for future delivery of annuity insurance policies to provide the Shareholder Annuity Option. Absent unusually low market interest rates at the time of the Fund Maturity Date, the value of these options is not expected to represent a significant portion of the value the Fund's portfolio. The options will be issued by various insurance providers selected by the Fund's investment adviser.

A Fund may use derivative securities for other non-speculative purposes as described below under "Derivatives Risk".

The Funds are generally managed without regard to tax ramifications.

Temporary Investment Measures. Each Fund may temporarily depart from its normal investment policies—for instance, by allocating substantial assets to cash investments—in response to extraordinary market, economic, political, or other conditions. In doing so, the Fund may succeed in avoiding losses but otherwise fail to achieve its investment objective.

Principal and Other Investment Risks

The Funds invest mainly in bonds. As a result, they are subject to certain risks.

Bonds and Interest Rates

As a rule, when interest rates rise, bond prices fall. The opposite is also true: Bond prices go up when interest rates fall. Therefore, each Fund is subject to Interest Rate Risk, which is the chance that bond prices overall will decline over short or even long periods because of rising interest rates. Depending on the planned liquidation date of a Fund, Interest Rate Risk will tend to vary—it should be low for short-term Funds, moderate for intermediate-term funds, and higher for long-term Funds.

Why do bond prices and interest rates move in opposite directions? Let's assume that you hold a bond offering a 5% yield. A year later, interest rates are on the rise and bonds of comparable quality and maturity are offered with a 6% yield. With higher-yielding bonds available, you would have trouble selling your 5% bond for the price you paid—you would probably have to lower your asking price. On the other hand, if interest rates were falling and 4% bonds were being offered, you should be able to sell your 5% bond for more than you paid.

Bonds and Maturity

Although bonds are issued with a specific maturity date, a bond issuer may be able to redeem, or call, a bond earlier than its maturity date. The bondholder must now replace the called bond with a bond that may have a lower yield than the original. Therefore, because each Fund may invest in bonds that are callable, each Fund is subject to Call Risk, which is the chance that during periods of falling interest rates a bond issuer will call—or repay—a higher-yielding bond before its maturity date. The Fund could lose the opportunity for additional price appreciation, and could be forced to reinvest the unanticipated proceeds at lower interest rates. As a result, the Fund could experience a decline in income and the potential for taxable capital gains. However, because the Fund expects that its investments in callable bonds will primarily be made to manage portfolio duration in circumstances where the bonds' issuers are expected to call the bonds, this is not considered to be a principal risk of the Fund.

Bonds and Credit Risk

A bond's credit quality depends on the issuer's ability to pay interest on the bond and, ultimately, to repay the principal. Credit quality is evaluated by one of the independent bond-rating agencies (for example, Moody's or Standard & Poor's). The lower the rating, the greater the chance—in the rating agency's opinion—that the bond issuer will default, or fail to meet its payment obligations. All things being equal, the lower a bond's credit rating, the higher its yield should be to compensate investors for assuming additional risk. Bonds rated Baa3 or better by Moody's, BBB- by S&P, or the equivalent by another independent rating agency are considered investment grade and are eligible for purchase by the Funds.

All of the Funds are therefore subject to Credit Risk, which is the chance that a bond issuer will fail to pay interest and principal in a timely manner.

Derivatives Risk

A derivative is a financial contract whose value is based on (or "derived" from) a traditional security (such as a stock or a bond), an asset (such as a commodity like gold), or a market index (such as the S&P 500 Index). Some forms of derivatives, such as exchange-traded futures and options on securities, commodities, or indexes, have been trading on regulated exchanges for more than two decades. These types of derivatives are standardized contracts that can easily be bought and sold, and whose market values are determined and published daily. Nonstandardized derivatives (such as swap agreements or forward contracts), on the other hand, tend to be more specialized or complex, and may be harder to value. If used for speculation or as leveraged investments, derivatives can carry considerable risks.

The Funds will use forward contracts based on the interest coupons payable on investment grade corporate and other bonds. Forward contracts, futures, options, and other derivatives may represent up to [ ]% of a Fund's total assets. In addition to forward contracts relating to coupons payable on bonds, these investments may be in bond futures contracts, options, credit swaps, interest rate swaps, and other types of derivatives. Losses (or gains) involving futures can sometimes be substantial—in part because a relatively small price movement in a futures contract may result in an immediate and substantial loss (or gain) for a Fund. Similar risks exist for other types of derivatives. For this reason, the Funds will not use forwards, futures, options, or other derivatives for speculative purposes or as leveraged investments that magnify the gains or losses of an investment. A Fund may invest in futures, options and other derivatives to keep cash on hand to meet shareholder redemptions or other needs while simulating full investment in bonds; to reduce the Fund's transaction costs; for hedging purposes; or to add value when these instruments are favorably priced.

Illiquid Securities

Illiquid securities are securities that a Fund may not be able to sell in the ordinary course of business. Each Fund may invest up to 15% of its net assets in these securities. Restricted securities are a special type of illiquid security; these securities have not been publicly-issued and legally can be resold only to qualified institutional buyers. From time to time, the Board of Trustees may determine that particular restricted securities are NOT illiquid, and those securities may then be purchased by a Fund without limit.

U.S. Treasury Policy Risk

The U.S. Treasury has announced its intention to cease issuing treasury bonds with maturities longer than 10 years. This will reduce the ability of the Funds to use Treasury securities for high credit quality, high-liquidity long-term investments. It may also mean that the interest rates on existing long-term Treasuries will decline as demand exceeds the limited supply.

Management Risk

Each Fund is subject to Management Risk, which is the risk that the Fund's investment adviser may choose not to use a particular investment strategy or type of security for a variety of reasons. These choices may cause the Fund to miss opportunities, lose money or not achieve its investment objective.

Portfolio Turnover

Although the Funds normally seek to invest for the long term and portfolio turnover is not expected to exceed 100% annually (and may be much lower), each Fund may sell securities regardless of how long they have been held. Portfolio turnover contributes to transaction costs, such as brokerage commissions, that may affect a Fund's performance. Higher turnover rates may also be more likely to generate capital gains that must be distributed to shareholders as taxable income.

Market-Timing

Some investors try to profit from a strategy called market-timing—switching money into mutual funds when they expect prices to rise and taking money out when they expect prices to fall. As money is shifted in and out, a Fund incurs expenses for buying and selling securities. These costs are borne by all Fund shareholders, including the long-term investors who do not generate the costs. This is why the Funds have adopted special policies to discourage short-term trading or to compensate the Funds for the costs associated with it. Specifically—

Each Fund reserves the right to reject any purchase request—including exchanges from other Funds—which it regards as disruptive to efficient portfolio management. A purchase request could be rejected because of the timing of the investment or because of a history of excessive trading by the investor.

Each Fund limits the number of times that an investor can exchange into and out of the fund (presently once in any 12 month period).

Each Fund reserves the right to stop offering shares at any time.

Each Fund charges a redemption fee as described in the Fund's "Fees and Expenses" table.

Fund Distributions

Each Fund distributes to shareholders virtually all of its net income (interest less expenses), as well as any capital gains realized from the sale of its holdings. The Funds' income dividends accrue daily and are distributed, together with capital gains, once each year in December. In addition, the Funds may occasionally be required to make supplemental capital gains distributions at other times during the year. When the distribution is made, the share price decreases by the amount of the per-share distribution. Your distribution is automatically reinvested in the Funds' shares, so that your total Fund holdings have the same value as before the distribution. To ensure that you also have the same number of shares after the distribution as before, the Fund's Board of Trustees also declares a reverse share split that offsets the per-share amount of the distribution. This is important so that the target payout and the monthly benefit per share also remain unchanged after a distribution.

Share Price

Each Fund's share price, called its net asset value, or NAV, is calculated each business day after the close of regular trading on the New York Stock Exchange, generally 4 p.m., Eastern time. NAV is computed by dividing the net assets attributed to each share class by the number of Fund shares outstanding for that class. On holidays or other days when the Exchange is closed, the NAV is not calculated, and the Fund will not transact purchase or redemption requests. However, on those days the value of a Fund's assets may be affected to the extent that the Fund holds foreign securities that trade on foreign markets that are open.

Bonds held by a Fund are valued based on information furnished by an independent pricing service or market quotations. Certain short-term debt instruments used to manage a fund's cash are valued on the basis of amortized cost.

When pricing service information or market quotations are not readily available, securities are priced at their fair value, calculated according to procedures adopted by the Board of Trustees. A Fund also may use fair-value pricing if the value of a security it holds is materially affected by events occurring after the close of the primary markets or exchanges on which the security is traded. This most commonly occurs with foreign securities, but may occur in other cases as well. When fair-value pricing is used, the prices of securities used by a fund to calculate its net asset value may differ from quoted or published prices for the same securities.

Purchase of Shares

Each Fund reserves the right in its sole discretion to reduce or waive the minimum investment for or any other restrictions on initial and subsequent investments for certain fiduciary accounts such as employee benefit plans or under circumstances where certain economies can be achieved in sales of the Fund's shares.

Redemption of Shares

Before the Fund Maturity Date. Shares of each Fund may be redeemed on any day when the New York Stock Exchange is open for regular trading. The redemption price is the NAV per share next determined after receipt of the redemption request in good order, less the applicable redemption fee, if any. Payment on redemption will generally be made as promptly as possible. However, a Fund may delay sending you the proceeds for up to seven days after the request for redemption are received by the Fund in good order.

On the Fund Maturity Date. It is expected that the Board of Trustees will liquidate each Fund on its Fund Maturity Date, which is June 30 of the year after which the Fund is named. For each Fund share you own on the Fund Maturity Date (or the actual liquidation date, if different), you will have the choice of receiving—

A lump sum cash payment equal to the actual net asset value per share achieved by the Fund, which is expected to be at least equal to the minimum target payout.

An option and sufficient cash to purchase an annuity insurance contract paying $1.00 per month for life, in effect providing you with a lifetime pension equal to $1.00 per month for each share you own. The option will automatically be exercised immediately following its distribution to you by the insurance company providing the annuity contract. The value of the annuity payments may be reduced if the Fund does not achieve its target payout. Additionally, the value of the actual annuity payments will be set at the time the contract is issued, and may be adjusted at that time based on your age and the number of beneficiaries as described in the "Annuity Payment Adjustments" section in the Fund's summary above.

A combination of a cash payment for some shares and an option to purchase a life annuity contract for your other shares.

Generally:

Each Fund may suspend redemption privileges or postpone the date of payment: (i) during any period that the New York Stock Exchange is closed, or trading on the Exchange is restricted as determined by the Securities and Exchange Commission (the "SEC"), (ii) during any period when an emergency exists as defined by the SEC as a result of which it is not reasonably practicable for a Fund to dispose of securities owned by it, or fairly to determine the value of its assets, and (iii) for such other periods as the SEC may permit.

Except for the redemption fee described in each Fund's "Fees and Expenses" table, there are no charges associated with a redemption. A Fund will always redeem your oldest shares first. From time to time, a Fund may waive or modify redemption transaction fees for certain categories of investors.

Each Fund generally will make all redemption payments in cash, but reserves the right to make redemptions wholly or partly in-kind if the investment advisers determines, in its sole discretion, that it would be detrimental to the Fund's remaining shareholders to make a particular redemption wholly or partly in cash. Any redemption in-kind will be in the form of readily marketable securities selected by the Fund's investment adviser from the Fund's portfolio. These securities would be valued in the same way the Fund determines its NAV. In-kind distributions may be made without prior notice, and you may have to pay brokerage or other transaction costs to convert the securities to cash.

Exchanging Shares

You may exchange your shares for shares of any other PensionShares Fund without payment of any exchange fee. However, the exchange privilege is limited to one exchange in any 12 month period.

Shareholder Taxes

The Funds are intended for purchase by investors through tax-deferred accounts such as IRA and 401(k) accounts. However, if you are a taxable investor, the Fund will send you a statement each year showing the tax status of all your distributions. In addition, taxable investors should be aware of the following basic tax points:

Distributions are taxable to you for federal income tax purposes whether or not you reinvest these amounts in additional Fund shares.

Distributions declared in December—if paid to you by the end of January—are taxable for federal income tax purposes as if received in December.

Any dividends and short-term capital gains that you receive are taxable to you as ordinary income for federal income tax purposes.

Any distributions of net long-term capital gains are taxable to you as long-term capital gains for federal income tax purposes, no matter how long you've owned shares in the Fund.

Capital gains distributions may vary considerably from year to year as a result of the Funds' normal investment activities and cash flows.

A sale or exchange of Fund shares is a taxable event. This means that you may have a capital gain to report as income, or a capital loss to report as a deduction, when you complete your federal income tax return.

Dividend and capital gains distributions that you receive, as well as your gains or losses from any sale or exchange of Fund shares, may be subject to state and local income taxes. Depending on your state's rules, however, any dividends attributable to interest earned on direct obligations of the U.S. government may be exempt from state and local taxes. Your Fund will notify you each year how much, if any, of your dividends may qualify for this exemption.

Tax Status of the Funds

Each Fund intends to continue to qualify as a "regulated investment company" under Subchapter M of the Internal Revenue Code of 1986, as amended. This special tax status means that a Fund will not be liable for federal tax on income and capital gains distributed to shareholders. In order to preserve its tax status, each Fund must comply with certain requirements. If a Fund fails to meet these requirements in any taxable year, it will be subject to tax on its taxable income at corporate rates, and all distributions from earnings and profits, including any distributions of net tax-exempt income and net long-term capital gains, will be taxable to shareholders as ordinary income. In addition, a Fund could be required to recognize unrealized gains, pay substantial taxes and interest, and make substantial distributions before regaining its tax status as a regulated investment company.

Glossary of Investment Terms

AVERAGE MATURITY: The average length of time until bonds held by a fund reach maturity (or are called) and are repaid. In general, the longer the average maturity, the more a fund's share price will fluctuate in response to changes in market interest rates.

BOND: A debt security (IOU) issued by a corporation, government, or government agency in exchange for the money you lend it. In most instances, the issuer agrees to pay back the loan by a specific date and make regular interest payments until that date.

BOND IMMUNIZATION: This describes the selection of a bond portfolio so that the ultimate value of the portfolio over a specified period of time is immune to changes in interest rates, even though the day-to-day value of the portfolio will change because of interest rate changes. If the portfolio is not immunized, there is risk that the reinvestment of bond interest payments at lower interest rates would cause the ultimate value of the portfolio to be lower than expected based on the interest rate structure at inception. A condition for a Fund's portfolio to be immunized is that the duration of the portfolio is the same as the time to maturity for the fund.

CAPITAL GAINS DISTRIBUTION: Payment to mutual fund shareholders of gains realized on securities that a fund has sold at a profit, minus any realized losses.

CASH INVESTMENTS: Cash deposits, short-term bank deposits, and money market instruments that include U.S. Treasury bills, bank certificates of deposit (CDs), repurchase agreements, commercial paper, and banker's acceptances.

DIVIDEND INCOME: Payment to shareholders of income from interest or dividends generated by a fund's investments.

DURATION: The duration of a bond portfolio is the average time to repayment of the bonds, including interest payments as well as the final principal repayments. Duration will be less than the average maturity if the bond pays interest; for zero-coupon bonds, duration equals time to maturity. Duration is also a measure of the volatility of the portfolio, so long-duration is the same as highly-volatile.

EXPENSE RATIO: The percentage of a fund's average net assets used to pay its expenses during a fiscal year. The expense ratio includes management fees, administrative fees, and any 12b-1 distribution fees.

FACE VALUE: The amount to be paid at a bond's maturity; also known as the par value or principal.

FIXED-INCOME SECURITIES: Investments, such as bonds, that have a fixed payment schedule. While the level of income offered by these securities is predetermined, their prices may fluctuate.

INVESTMENT ADVISER: An organization that makes the day-to-day decisions regarding a fund's investments.

INVESTMENT GRADE: A bond whose credit quality is considered by any independent bond-rating agency to be sufficient to ensure timely payment of principal and interest under current economic circumstances. Bonds rated Baa3 or better by Moody's Investors Service, Inc., BBB- by Standard & Poor's ("S&P"), or the equivalent by another independent rating agency are considered investment grade.

MATURITY: The date when a bond issuer agrees to repay the bond's principal, or face value, to the bond's buyer.

NET ASSET VALUE (NAV): The market value of a mutual fund's total assets, minus liabilities, divided by the number of shares outstanding. The value of a single share is also called its share value or share price.

PRINCIPAL: The amount of money you put into an investment.

TOTAL RETURN: A percentage change, over a specified time period, in a mutual fund's net asset value, assuming the reinvestment of all distributions of dividends and capital gains.

VOLATILITY: The fluctuations in value of a mutual fund or other security. The greater a fund's volatility, the greater the change in day-to-day values, and the less reliable the fund is for short-term investment.

YIELD: Income (interest or dividends) earned by an investment, expressed as a percentage of the investment's price.

End of PENSIONSHARES 2022 FUND EXAMPLE

CONCLUSION

It is to be understood that the foregoing detailed description of the preferred methods for practicing the invention are merely illustrative applications of the principles of the invention. Numerous modifications may be made to the specific methods described without departing from the true scope and spirit of the invention.

What is claimed is:

1. A method for issuing and redeeming an investment instrument that entitles its current holder to elect to receive at a maturity date specified in said instrument as first issued either a minimum lump sum cash payment specified by said instrument or to instead receive a specified minimum annuity income after said maturity date, said method comprising, in combination, the steps of:

issuing said instrument denominated as a number of units or shares each of which as issued entitles said current holder of said instrument to receive a specified monetary unit of a specified currency payable at periodic calendar intervals after said maturity date, and paying to said current holder of said instrument at said maturity date either said minimum lump sum cash payment specified by said instrument as issued or, in the alternative and at the option the said current holder, transferring to said current holder at said maturity date an annuity which entitles said holder to receive for each of said units or shares at least said specified monetary unit of said specified currency payable at said periodic calendar intervals as specified in said instrument as issued.

2. A method for issuing and redeeming an investment instrument as set forth in claim 1 wherein said specified monetary unit in a specified currency payable at said periodic calendar intervals is one dollar per month for each of said units or shares.

3. The method of issuing and redeeming an investment instrument as set forth in claim 1 wherein said instrument further entitles its holder to redeem upon request made prior to said maturity date some or all of said units or shares for a stated current monetary value per unit or share periodically published, reported or revealed by the issuer of said instrument, and wherein said units or shares are issued to said current holder in exchange for a purchase price payment equal to said stated current monetary value at the time said units or shares are issued.

4. The method of issuing and redeeming an investment instrument as set forth in claim 2 wherein said instrument further entitles its holder to redeem upon request made prior to said maturity date some or all of said units or shares for a stated current monetary value per unit or share periodically published, reported or revealed by the issuer of said instrument, and wherein said units or shares are issued to said current holder in exchange for a purchase price payment equal to said stated current monetary value at the time said units or shares are issued.

5. The method of issuing and managing an investment instrument denominated as a number of units or shares each of which as first issued entitles a holder to receive a specified monetary unit of a specified currency at periodic calendar intervals specified in said instrument as issued or, in the alternative, said method comprising the steps of:

issuing said investment instrument to a holder in exchange for an initial investment, after issuing said investment instrument, periodically publishing, reporting or otherwise revealing to the current holder of said investment instrument the stated current monetary value of said units or shares, on or about at a future maturity date specified in said instrument as issued, paying a lump sum monetary payment to the current holder of said investment instrument at said maturity date which will provide a guaranteeable minimum rate of return on said initial investment during the accumulation period preceding said maturity date as specified in said instrument as issued, and at the option of said holder exercised on or about said maturity date, converting all or part of said investment instrument or said lump sum monetary payment into the right to receive a guaranteeable annuity income consisting of at least said specified monetary unit of said specified currency for each of said units or shares payable at each of said periodic calendar intervals as specified in said instrument as issued.

6. The method of issuing and managing an investment instrument as set forth in claim 5 further comprising the steps of redeeming said investment instrument at the request of the current holder of said investment instrument during said accumulation period by purchasing from said holder all or part of said units or shares prior to said maturity date for an amount substantially equal to said stated current monetary value of said units or shares, and issuing additional equivalent units or shares to said holder in exchange for an additional purchase price payment equal to said stated current monetary value of said additional units or shares.

7. The method of issuing and managing investment an instrument as set forth in claim 5 wherein said single monetary unit of a specified currency payable for each of said units or shares at periodic calendar intervals is a specified integral number of dollars payable monthly, quarterly or annually for each of said units or shares.

8. The method of issuing and managing an instruments as set forth in claim 5 wherein said single monetary unit of specified currency payable for each of said units or shares at periodic calendar intervals is one dollar per month for each of said units or shares.

9. The method of issuing and managing an investment instrument that allows its holder to own a liquid investment asset and to know with reasonable certainty both the asset's minimum value at a future maturity date specified by said instrument as first issued as a minimum guaranteeable lump sum payment amount and to know the minimum annuity income that the asset can provide after said maturity date as specified in said instrument as first issued, said method including the steps of:

denominating said investment instrument as a number of units or shares each of which provide a minimum annuity income that said holder will have the right to receive each month after said maturity date, said minimum annuity income being expressed in said instrument as first issued as a single monetary unit of a specified currency, periodically publishing, reporting or otherwise revealing to said holder the stated current monetary value of said units or shares, transferring said number of units or shares to said holder in exchange for a purchase price payment equal to said stated monetary value of said units or shares at the time said units or shares are transferred, upon demand made by said holder made prior to said maturity date, exchanging all or part of said units or shares for a redemption value substantially equal to said stated current monetary value at the time of said demand, paying to said holder at said maturity date at least said minimum guaranteeable lump sum payment amount specified in said instrument as first issued, and converting, upon demand by said holder on or about said maturity date, all or part of said specified lump sum payment amount into an annuity which entitles the holder to receive said minimum annuity income for each of said units or shares as specified in said instrument as first issued.

10. The method of issuing and managing an investment instrument as set forth in claim 9 wherein annuity provides said annuity income during the life said holder or the lives of said holder and a survivor, said product further specifies adjustments to the amount to be paid monthly based on the age of the holder or the age of the holder's survivor at the time all or part of said specified lump sum payment is converted to said annuity.

11. The method of issuing and managing an investment instrument as set forth in claim 9 wherein said single monetary unit of a specified currency payable for each of said units or shares at periodic calendar intervals is a specified integral number of dollars payable monthly, quarterly or annually for each of said units or shares.

12. The method of issuing and managing an investment instrument as set forth in claim 11 wherein said single monetary unit of specified currency payable for each of said units or shares at periodic calendar intervals is one dollar per month for each of said units or shares.

\* \* \* \* \*